(12) United States Patent
Wang

(10) Patent No.: US 12,524,000 B2
(45) Date of Patent: Jan. 13, 2026

(54) VEHICLE FAULT DIAGNOSTIC METHOD AND ON-BOARD DIAGNOSTIC APPARATUS

(71) Applicant: SHENZHEN YINWANG INTELLIGENT TECHNOLOGIES CO., LTD., Shenzhen (CN)

(72) Inventor: Zhe Wang, Dongguan (CN)

(73) Assignee: SHENZHEN YINWANG INTELLIGENT TECHNOLOGIES CO., LTD, Shenzhen (CN)

( * ) Notice: Subject to any disclaimer, the term of this patent is extended or adjusted under 35 U.S.C. 154(b) by 60 days.

(21) Appl. No.: 18/486,707

(22) Filed: Oct. 13, 2023

(65) Prior Publication Data
US 2024/0053738 A1 Feb. 15, 2024

Related U.S. Application Data

(63) Continuation of application No. PCT/CN2022/087007, filed on Apr. 15, 2022.

(30) Foreign Application Priority Data

Apr. 16, 2021 (CN) .......................... 202110413019.9

(51) Int. Cl.
*G05B 23/02* (2006.01)
*G05B 19/048* (2006.01)
*G06F 11/07* (2006.01)

(52) U.S. Cl.
CPC ....... *G05B 23/0275* (2013.01); *G05B 19/048* (2013.01); *G05B 23/027* (2013.01); *G06F 11/0739* (2013.01); *G05B 2219/24065* (2013.01)

(58) Field of Classification Search
CPC ..... B60W 50/0205; G05B 2219/24065; G05B 2219/2637; G06F 11/0739
See application file for complete search history.

(56) References Cited

U.S. PATENT DOCUMENTS 6,012,004 A * 1/2000 Sugano ................ G07C 5/0808
710/110
8,924,772 B2 * 12/2014 Abe ..................... G06F 11/1654
714/11

(Continued)

FOREIGN PATENT DOCUMENTS

| CN | 102046443 A | 5/2011 |
| CN | 105292021 A | 2/2016 |
| CN | 109165124 A | 1/2019 |

OTHER PUBLICATIONS

Varun et al., "Automotive Ethernet in On-Board Diagnosis (Over IP) and in-vehicle networking," Proceedings of 2014 International Conference on Embedded Systems (ICES), Jul. 3, 2014, 6 pages.

(Continued)

*Primary Examiner* — Calvin Cheung
(74) *Attorney, Agent, or Firm* — Fish & Richardson P.C.

(57) ABSTRACT

A vehicle diagnostics technology is provided. Further, a vehicle fault diagnostic method, an on-board diagnostic apparatus, and a related system that are used for advanced intelligent driving are provided. In an example method, a first diagnostic module monitors and records first fault information, and a second diagnostic module monitors and records second fault information. The second diagnostic module sends the second fault information to the first diagnostic module. The example method further includes the first diagnostic module communicating with a master computer through a first communication interface and the second diagnostic module communicating with the master computer through a second communication interface.

20 Claims, 14 Drawing Sheets

(56) References Cited

U.S. PATENT DOCUMENTS

2008/0177438 A1 7/2008 Chen et al.
2012/0277949 A1 11/2012 Ghimire et al.

OTHER PUBLICATIONS

Zhang et al., "An Autopilot Fault Diagnosis Method Based on Hybrid Case and Fault Trees," Applied Mechanics and Materials, vols. 373-375, Aug. 30, 2013, 5 pages.
Lee et al., "Automotive Diagnostic Gateway using Diagnostic over Internet Protocol," IEIE Transactions on Smart Processing and Computing, vol. 3, No. 5, Oct. 2014, 6 pages.
Jiang, "Development Trend of Automotive Fault Diagnosis Technology," China New Technologies and Products, 2010, No. 9, 2 pages (with English abstract).
Chen et al., "Present State and Perspectives of Automotive Fault Diagnosis Expert System," Chinese Journal of Mechanical Engineering, vol. 39, No. 11, Nov. 2003, 6 pages (with English abstract).
International Search Report and Written Opinion in International Appln. No. PCT/CN2022/087007, mailed on Jun. 29, 2022, 19 pages (with English translation).
Extended European Search Report in European Appln No. 22787623.2, dated Sep. 10, 2024, 7 pages.

\* cited by examiner

VEHICLE FAULT DIAGNOSTIC METHOD AND ON-BOARD DIAGNOSTIC APPARATUS

CROSS-REFERENCE TO RELATED APPLICATIONS

This application is a continuation of International Application No. PCT/CN2022/087007, filed on Apr. 15, 2022, which claims priority to Chinese Patent Application No. 202110413019.9, filed on Apr. 16, 2021. The disclosures of the aforementioned applications are hereby incorporated by reference in their entireties.

TECHNICAL FIELD

This application relates to a vehicle fault diagnostic method and an on-board diagnostic apparatus.

BACKGROUND

On-board diagnostics (OBD, On-Board Diagnostics) is a system used to detect a fault on a vehicle. When a fault occurs on the vehicle, the on-board diagnostics (OBD, On-Board Diagnostics) can determine a specific fault type, and indicate different types of faults in a form of diagnostic trouble codes (DTC, Diagnostic Trouble Codes).

However, with development of autonomous driving and new energy vehicle technologies, a vehicle has increasingly more functions, a control system is increasingly more complex, and fault information corresponding to a complex control system is also various. Existing on-board diagnostics OBD collects all the fault information in a unified manner and performs diagnosis based on the collected fault information. However, when all the fault information is collected together in the unified manner for diagnosis, it is difficult to accurately determine which function or functions are faulty and how to perform repair. A more powerful function such as autonomous driving of the vehicle indicates a more insufficient diagnostic capability of such a diagnostic method.

SUMMARY

This application provides a vehicle fault diagnostic method, an on-board diagnostic apparatus, and the like, to improve a diagnostic capability and cope with a complex function such as autonomous driving.

A first aspect of this application provides an on-board diagnostic apparatus, including: a first diagnostic module, configured to: monitor and record first fault information; a second diagnostic module, configured to: monitor and record second fault information, and send the second fault information to the first diagnostic module; a first communication interface, configured to enable the first diagnostic module to communicate with a master computer; and a second communication interface, configured to enable the second diagnostic module to communicate with the master computer.

According to the on-board diagnostic apparatus in the foregoing manner, the first diagnostic module and the second diagnostic module perform hierarchical fault diagnosis on a vehicle. The second diagnostic module not only sends the second fault information to the first diagnostic module, but also can communicate with the master computer through the second communication interface. Therefore, fault diagnosis can be separately performed by level, fault information of different functions can be independently reported by each level, and different fault information can be isolated, to enhance readability and pertinence of the fault information, increase certainty of diagnosing a fault source and reliability of fault judgment, and the like, so as to improve a diagnostic capability and cope with a complex function such as autonomous driving.

In addition, because the second diagnostic module sends the second fault information to the first diagnostic module, the second fault information is not only recorded in the node, namely, the second diagnostic module, but also backed up and recorded by an upper-level node, namely, the first diagnostic module. In addition, for example, once a lower-level node fails completely, an upper-level node can know and record failure information in time, and take a countermeasure, for example, take over a diagnostic fault management function of the lower-level node, and restart or repair a system.

In addition, in a possible implementation of the first aspect, the on-board diagnostic apparatus further includes: a third diagnostic module, configured to: monitor and record third fault information, and send the third fault information to the second diagnostic module; and a third communication interface, configured to enable the third diagnostic module to communicate with the master computer.

In a possible implementation of the first aspect, the second fault information includes second diagnostic module fault information indicating a fault of the second diagnostic module. The first diagnostic module is further configured to repair the second diagnostic module when receiving the second node fault information.

In a possible implementation of the first aspect, the third fault information includes third diagnostic module fault information indicating a fault of the third diagnostic module. The second diagnostic module is further configured to repair the third diagnostic module when receiving the third diagnostic module fault information.

In the foregoing manner, the first diagnostic module repairs the second diagnostic module when receiving the second node fault information indicating the fault of the second diagnostic module, and the second diagnostic module repairs the third diagnostic module when receiving the third diagnostic module fault information. Therefore, an upper-level module (the first diagnostic module or the second diagnostic module) can perform targeted repair on a fault of a lower-level node (the second diagnostic module or the third diagnostic module), to improve a capability of coping with a complex system such as autonomous driving.

In addition, a self-repair capability is also represented by hierarchical nodes, and each node can have a specific decision-making capability to cope with a fault. When the vehicle has a level-by-level repair capability for the fault, and when the external master computer or a server cannot analyze, repair, and refresh the fault in time, the vehicle can first perform self-repair at a minimum cost, to keep the vehicle running with the fault as far as possible, and maintain driving safety.

In a possible implementation of the first aspect, the first fault information includes fault information of an underlying system.

In the foregoing manner, the first fault information managed by the first diagnostic module includes the fault information of the underlying system, so that the first diagnostic module can be responsible for, for example, diagnostic processing of the underlying system of a complex vehicle autonomous driving system (for example, an ADAS system). The first diagnostic module can not only provide independent diagnosis for the underlying system and an operating environment, but also ensure that diagnosis of the complex vehicle autonomous driving system is advanced to a start moment of the driving system, so that an abnormality within a start time period can be diagnosed and recorded, to prevent a loss of fault information and ensure a full time period of a fault record. In addition, the first diagnostic module can enable the first diagnostic module or direct a lower-level failed node to cooperate with over the air (OTA, Over the Air) communication or near-end upgrade.

In a possible implementation of the first aspect, the second fault information includes fault information of a driving assistance category module.

In the foregoing manner, a plurality of scenario features are classified and modularized for diagnosis. In this way, a hardware fault and a data processing fault related to a scenario feature are handled only on a module node on which the scenario feature is deployed. Fault diagnosis on different module nodes can be performed concurrently. In addition, module nodes can be flexibly divided and dynamically increased or decreased based on various classification manners of driving assistance processing, to effectively use computing resources and support expandability of scenario features on the module nodes.

In a possible implementation of the first aspect, the third fault information includes fault information of a driving assistance scenario feature.

In the foregoing manner, as described above, the third diagnostic module can communicate with the master computer to provide a separate diagnostic access point externally. This can facilitate a quick implementation of location and repair of feature-level fault diagnosis, without affecting more scenario feature applications and system operation. When a feature fault is detected, the fault can be quickly diagnosed and then directly repaired in a targeted manner, or the fault can be repaired by using an OTA, to improve location and repair efficiency of diagnosis.

In addition, in the foregoing implementation of the first aspect of this application, hierarchical diagnosis is performed. Fault information of a lower-level diagnostic node is sent to an upper-level node of the lower-level diagnostic node. Therefore, when a fault or complete failure occurs on the lower-level diagnostic node, the upper-level node can detect the fault in time, and the upper-level node can easily take over and locate the fault. In this way, a target effective diagnostic measure can be provided when a fault occurs on a small scale, to effectively improve pertinence and reliability of diagnosis.

According to the first aspect or any one of the possible implementations of the first aspect, in a seventh possible implementation of the vehicle diagnostic method, repair of the lower-level node is performed at the upper-level node based on the fault information of the lower-level node.

In a possible implementation of the first aspect, the first, second, or third diagnostic module communicates with the master computer based on DoIP (Diagnostic communication over Internet Protocol, diagnostic communication over internet protocol).

Communication between a node and the master computer can adopt a network protocol for diagnosis on a bus Ethernet ETH, which makes a communication capability between the node and an external apparatus of the vehicle powerful, to support quick repair and provide a capability of exchanging a large amount of data within a short period of time, and make remote direct diagnosis possible.

In a possible implementation of the first aspect, when the first fault information includes a fault of the underlying system, the first diagnostic module communicates with the master computer through a low-speed bus CAN.

A node configured to diagnose the fault of the underlying system communicates with the external apparatus of the vehicle with a small amount of data, which requires only low communication speed and bandwidth, so that production costs can be reduced by using the bus CAN that is mature in technology and easy to purchase from a market.

A second aspect of this application provides a vehicle fault diagnostic method, including: A first diagnostic module monitors and records fault information; a second diagnostic module monitors and records fault information, and sends the second fault information to the first diagnostic module; the first diagnostic module communicates with a master computer through a first communication interface; and the second diagnostic module communicates with the master computer through a second communication interface.

According to the vehicle fault diagnostic method provided in the second aspect, similar to the first aspect, the first diagnostic module and the second diagnostic module perform hierarchical fault diagnosis on a vehicle. The second diagnostic module not only sends the second fault information to the first diagnostic module, but also can communicate with the master computer through the second communication interface. Therefore, fault diagnosis can be separately performed by level, fault information of different functions can be independently reported by each level, and different fault information can be isolated, to enhance readability and pertinence of the fault information, increase certainty of fault source diagnosis and reliability of fault judgment, and the like, so as to improve a diagnostic capability and cope with a complex function such as autonomous driving.

For technical effects of various implementations of the second aspect of this application, refer to technical effects described in the first aspect. Details are not described herein again.

In a possible implementation of the second aspect, the vehicle fault diagnostic method further includes: A third diagnostic module monitors and records fault information, and sends the third fault information to the second diagnostic module. The third diagnostic module communicates with the outside through a third communication interface.

In a possible implementation of the second aspect, the second fault information includes second diagnostic module fault information indicating a fault of the second diagnostic module. The vehicle fault diagnostic method further includes: The first diagnostic module repairs the second diagnostic module when receiving the second node fault information.

In a possible implementation of the second aspect, the third fault information includes third diagnostic module fault information indicating a fault of the third diagnostic module. The vehicle fault diagnostic method further includes: The second diagnostic module repairs the third diagnostic module when receiving the third diagnostic module fault information.

In a possible implementation of the second aspect, the first fault information includes fault information of an underlying system.

In a possible implementation of the second aspect, the second fault information includes fault information of a driving assistance category module.

In a possible implementation of the second aspect, the third fault information includes fault information of a driving assistance scenario feature.

A third aspect of this application provides a vehicle, including the on-board diagnostic apparatus in any structure in the first aspect.

A fourth aspect of this application further provides a fault diagnostic system for a vehicle. The fault diagnostic system includes the on-board diagnostic apparatus according to any one of the possible implementations of the first aspect, and further includes a master computer and a vehicle bus. The master computer is configured to: query fault information in each hierarchical diagnostic unit (a first, a second or a third diagnostic unit) in the on-board diagnostic apparatus, and perform repair. Each hierarchical diagnostic unit in the on-board diagnostic apparatus is communicatively connected with the master computer through the vehicle bus.

In a possible implementation of the fourth aspect, the hierarchical diagnostic unit communicates with the master computer based on DoIP.

In a possible implementation of the fourth aspect, a hierarchical diagnostic unit configured to diagnose fault information of a base node communicates with the master computer through a low-speed bus CAN.

According to a fifth aspect, this application further provides a computer-readable storage medium. The computer-readable storage medium stores program instructions. When the program instructions are run by a computer, the computer is enabled to perform the fault diagnostic method according to any one of the implementations of the second aspect.

According to a sixth aspect, this application further provides a computing apparatus. The computing apparatus includes a processor and a memory. The memory stores program instructions. When the program instructions are executed by at least one processor, the at least one processor is enabled to perform the fault diagnostic method according to any one of the implementations of the second aspect.

According to a sixth aspect, this application further provides an advanced driving assistance system ADAS. The ADAS system includes a sensor, a controller, and an executor. The controller includes the computing apparatus according to the fifth aspect.

For technical effects of the fault diagnostic system, the computer-readable storage medium, and the computing apparatus in this application, refer to the technical effects of the vehicle diagnostic method according to the first aspect. Details are not described herein again.

According to a seventh aspect, this application further provides an on-board safety system. The on-board safety system includes a storage unit and a control unit. The control unit includes a basic diagnostic unit. The basic diagnostic unit is configured to diagnose basic fault information. The basic fault information includes underlying system fault information and module fault information of a driving assistance category module. The storage unit is configured to store the basic fault information and a safety application instruction. The control unit executes, based on the basic fault information, a result of coping with the basic fault information by running a safety application in the storage unit. The basic diagnostic unit in the control unit communicates with a master computer through a first bus. An on-board micro-controller unit (Micro-controller Unit, MCU) may be an implementation form of the on-board safety system.

A node for diagnosing a fault of an underlying system is set in the on-board safety system, and the safety application is executed to cope with the fault of the underlying system and a module-level fault sent by a module node, to provide a possibility to meet compatibility with a computing unit or a chip provided with a module node.

According to an eighth aspect, this application further provides an artificial intelligence system on chip (AI SoC, Artificial Intelligence System On Chip). The system on chip includes a storage unit and a control unit. The control unit includes a module diagnostic unit and a module fault monitor corresponding to the module diagnostic unit. The module diagnostic unit is configured to diagnose module fault information of a driving assistance category module. The module fault monitor is configured to monitor the module diagnostic unit and report the module fault information to the basic diagnostic unit of the on-board safety system in the seventh aspect. The storage unit is further configured to store the module fault information and a driving assistance application instruction. The control unit executes, by running the driving assistance application instruction in the storage unit based on the module fault information, a result of coping with the module fault information. The module diagnostic unit of the system on chip communicates with a master through a second bus.

Implementing hierarchical diagnosis based on at least module nodes on the AI SoC improves abilities to aggregate and allocate various driving assistance scenario features, provides compatibility for heterogeneity among providers of different scenario features, and provides a possibility of enhancing redundancy of active and standby systems.

According to the eighth aspect, in a first possible implementation of the artificial intelligence system on chip, the control unit further includes a feature diagnostic unit and a feature fault monitor corresponding to the feature diagnostic unit. The feature diagnostic unit for diagnosing feature fault information of a driving assistance feature. The feature fault monitor is configured to monitor the feature diagnostic unit and report the feature fault information to the module diagnostic unit. The storage unit is further configured to store the feature fault information. The control unit further executes, based on the feature failure information, a result of coping with the feature fault information by running the driving assistance application instruction in the storage unit.

In this way, a case in which specific fault records cannot be obtained after faults occur in a scenario feature or even the entire scenario feature fails can be avoided. In addition, the feature diagnostic unit is located at a tail end level of the diagnostic node, so that a diagnostic access point does not need to be refined to an electronic control unit (Electronic Control Unit, ECU) with a single function, but directly has a specific fusion capability. This complies with huge concentration of computing power required by a computing and communication (CC, Compute-Communication) architecture.

According to the eighth aspect or a first possible implementation of the eighth aspect, in a second possible implementation of the artificial intelligence system on chip, the second bus is an ETH, and the system on chip communicates with the master computer based on DoIP.

According to a ninth aspect, a multi-domain controller (MDC, Multi-Domain Controller) is provided. The multi-domain controller MDC includes at least one on-board safety system in the seventh aspect and at least one system on chip in the eighth aspect or any one of the possible implementations of the eighth aspect.

For technical effects of the multi-domain controller in the ninth aspect of this application, refer to technical effects of the on-board safety system in the seventh aspect and the system on chip in the eighth aspect. Details are not described herein again.

According to a tenth aspect, a data recording method is provided. The data recording method is used to record fault information of a vehicle and includes the following steps: dividing, by using a driving assistance function of the vehicle as a diagnostic target, a plurality of levels of nodes for diagnosing a fault, where at least one lower-level node is deployed under at least one upper-level node; allocating an address to each node, where an address of a lower-level node includes an address of an upper-level node; reporting fault information to an upper-level node at a lower-level node, where the fault information includes at least an address of the lower-level node and a fault type in the form of a code; and storing the fault information in a database, to generate a hierarchical fault information tree based on a node address.

Each node is effectively associated with nodes at upper and lower levels, to form a complete fault diagnostic hierarchical tree, which is similar to a network topology structure. The hierarchical tree facilitates addressing and query, improves reliability of fault diagnosis and quick recovery, and simplifies fault alarm correlation analysis in practice.

Correspondingly, according to an eleventh aspect, a data recording apparatus is further provided. The data recording apparatus is configured to record fault information of a vehicle. The data recording apparatus includes: a node dividing unit, configured to divide, by using a driving assistance function as a diagnostic target, a plurality of levels of nodes for fault diagnosis, where at least one lower-level node is deployed under at least one upper-level node; an address allocating unit, configured to allocate an address to each node at each level, where an address of a lower-level node includes an address of an upper-level node; a fault reporting unit, configured to report fault information to an upper-level node at a lower-level node, where the fault information includes at least an address of the lower-level node and a fault type in the form of a code; and a database, configured to store the fault information, to generate a hierarchical fault information tree based on a node address.

For technical effects of the data recording apparatus in the eleventh aspect, refer to the technical effects of the data recording method according to the tenth aspect. Details are not described herein again.

According to the technical solutions of this application, hierarchical diagnosis is implemented, and a fault diagnostic capability of a complex system in a vehicle is significantly improved. The complex system of the vehicle can complete diagnosis of each level independently, which makes a fault diagnosis process cascade and complete. Fault diagnosis results present a complete tree structure, which improves readability and pertinence.

These or other aspects of this application are more concise and easier to understand in the description of the following (plurality of) embodiments.

BRIEF DESCRIPTION OF DRAWINGS

The following further describes features of this application and relationships between the features with reference to the accompanying drawings. The accompanying drawings are all examples, and some features are not shown in actual proportions. In addition, in some accompanying drawings, common features that are not mandatory for this application in the field of this application may be omitted. Alternatively, additional features that are not mandatory for this application are not shown. A combination of the features shown in the accompanying drawings is not intended to limit this application. In addition, in this specification, content referred to by same reference signs is also the same. The specific accompanying drawings are described as follows.

DESCRIPTION OF EMBODIMENTS

Unless otherwise defined, all technical and scientific terms used in this specification have same meanings as those usually understood by a person skilled in the art of this application. In case of any inconsistency, the meaning described in this specification or the meaning obtained according to the content recorded in this specification shall prevail. In addition, the terms used in this specification are merely for the purpose of describing embodiments of this application, but are not intended to limit this application.

On-board diagnostics (OBD, On-Board Diagnostics) is a system used to detect a vehicle fault. When a fault occurs on a vehicle, the on-board diagnostics (OBD, On-Board Diagnostics) can determine a specific fault type, and indicate different types of faults in a form of diagnostic trouble codes (DTC, Diagnostic Trouble Codes). An initial OBD technology only detects driving systems and exhaust emission systems related to vehicle exhaust pollution. With an expansion of a range of diagnostic objects, a second generation OBD technology with unified diagnostic services (UDS, Unified Diagnostic Services), which is also known as OBD-II, emerges, to monitor statuses of all emission-related components in real time.

Figure 15:
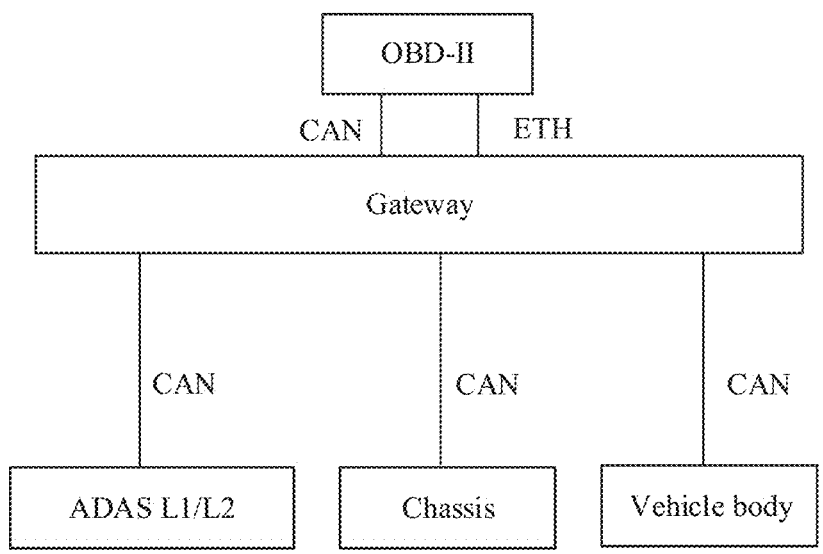
FIG. 15 is a schematic diagram of a conventional diagnosis in an EE network architecture.

In autonomous driving and new energy vehicles, a large-scale application of automotive electronics technology and vehicle bus enables an OBD diagnostic device to develop to detect faults for a vehicle condition of a whole vehicle. For example, as shown in FIG. 15, under an electronic and electrical (EE, Electronic and Electrical) architecture with interconnection of electronic control units (ECU, Electronic Control Unit), the OBD-II communicates with a plurality of ECUs through a vehicle bus CAN and/or Ethernet (Ethernet, ETH for short) through a gateway (Gateway). Each ECU has an independent access point for diagnosis. However, ECUs in the vehicle are distributed in various systems, and a number of the ECUs even reaches hundreds. For example, the ECUs are distributed in an engine management system (EMS, Engine Management System), a transmission control unit (TCU, Transmission Control Unit), and the like for power driving; distributed in a body control module, a door control module, a headlight control module, and the like on a vehicle body; distributed in an airbag, an electrical power steering (EPS, Electrical Power Steering), an electronic stability program (ESP, Electronic Stability Program), and the like for safety protection; and distributed in a navigation system, an audio and video playback system, and the like in a cockpit. In this distributed network architecture, each ECU has a single CPU processing unit, and an external diagnostic device accesses a diagnostic service of the ECU through an OBD/OBD-II interface.

Figure 16:
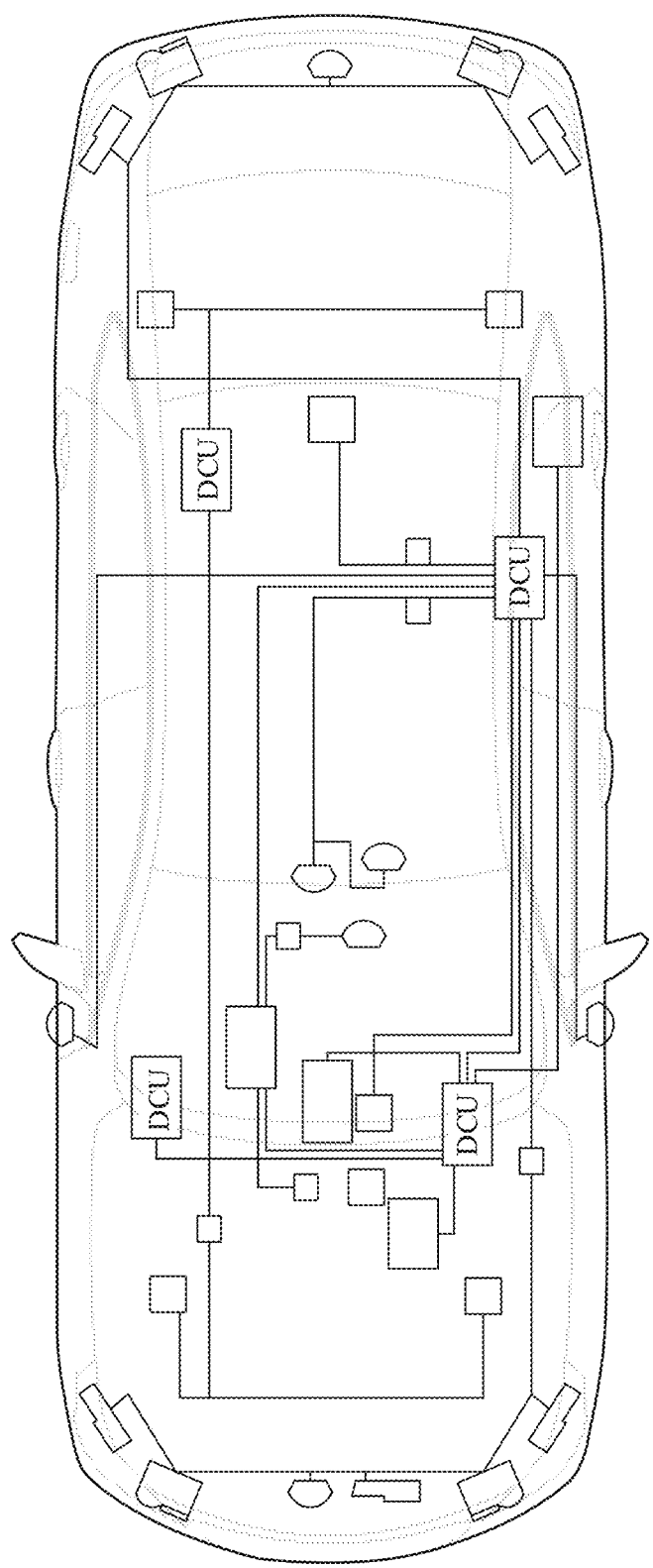
FIG. 16 is a schematic diagram of a conventional diagnosis in a DCU network architecture.

In an evolution process of a network architecture, computing capabilities of a plurality of ECUs are centralized in a domain control unit (DCU, Domain Control Unit). As shown in FIG. 16, one DCU is allocated to each domain, and is responsible for computing of a local domain, to compensate for an insufficient computing capability of the ECU, for example, an intelligent cockpit domain controller (CDC, Cockpit Domain Controller), a chassis domain controller (or referred to as a power domain controller, Chassis Domain controller), a body domain controller (Body Domain controller), and the like. In a network architecture of the DCU, an external diagnostic device uses the OBD/OBD-II interface to indirectly access each ECU in a domain through the DCU of each domain, but each ECU still accepts independent diagnostic access. It can be seen that, in a conventional EE architecture and a DCU architecture, each ECU provides a diagnostic access point. Therefore, all faults that can be recorded original fault information, for example, abnormal phenomena such as excessively high or low temperature and excessively high or low voltage.

Figure 17:
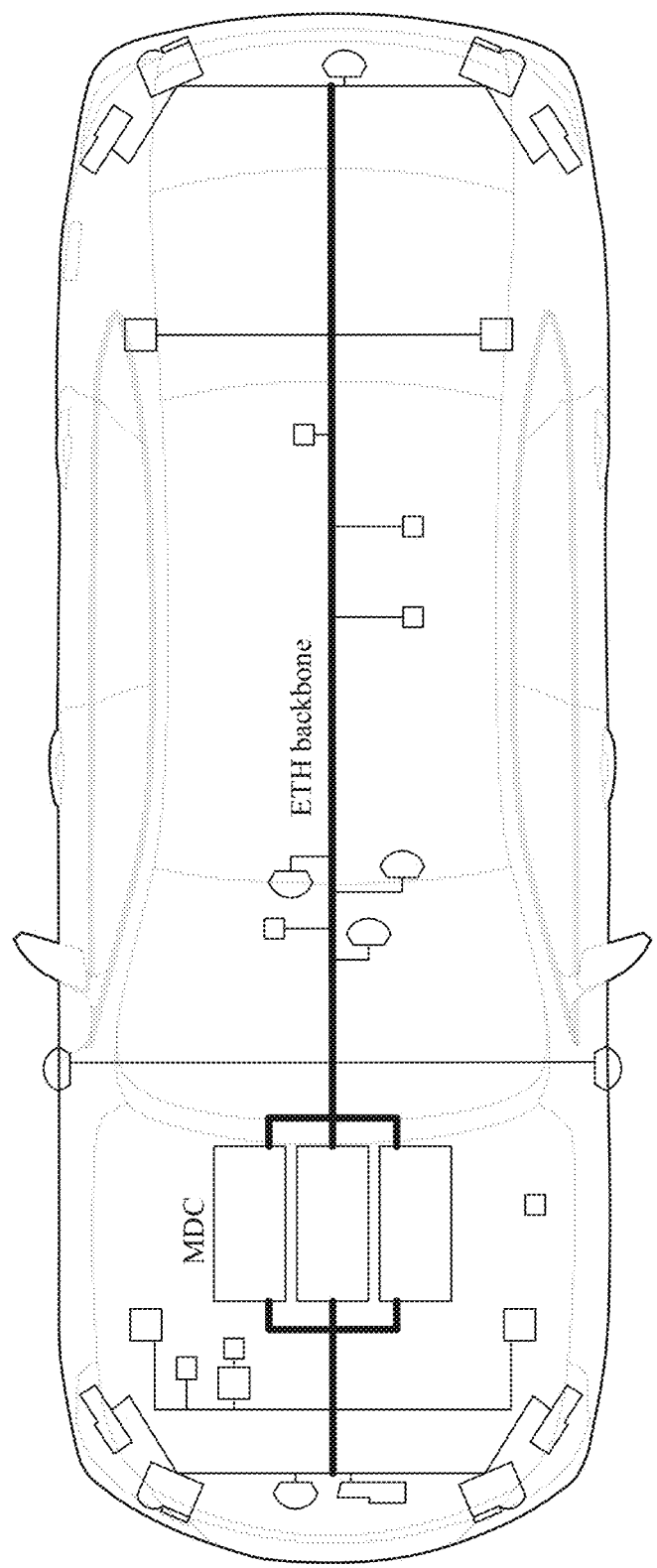
FIG. 17 is a schematic diagram of an MDC network architecture.

In addition, an autonomous driving technology, especially represented by an advanced driving assistance system (ADAS, Advanced Driving Assistance System) at an L1 or L2 level of autonomous driving, requires a large concentration of computing processing capabilities such as data collection, fusion, analysis, and decision-making. A network architecture of an on-board system tends to be a multi-domain control unit (MDC, Multi-Domain Control Unit), that is, ECUs of a plurality of domains are further incorporated to perform centralized computing in the MDC, and an Ethernet is mainly used as a backbone network for communication. As shown in FIG. 17, in this way, a "communication+computing" (CC, computing+communication) architecture is formed, so that an on-board network is more simplified and has good scalability and reliability.

As mentioned above, an existing on-board diagnostic method appears to be insufficient for complex vehicle functions. Therefore, this application provides a vehicle fault diagnostic method, an on-board diagnostic apparatus, and the like, to improve a diagnostic capability and cope with complexity of functions such as autonomous driving of a vehicle. The vehicle fault diagnostic method and the on-board diagnostic apparatus may be applied to the vehicle architecture described above.

To accurately describe technical content in this application and accurately understand this application, the following explanations, descriptions, or definitions are first provided for terms used in this specification before specific implementations are described.

A node (Node) refers to a logical unit or a logical module that controls and manages a fault diagnostic service of a vehicle and transmits and receives fault information (which may alternatively be referred to as a unit or module), is also an access point for diagnostic access by an external diagnostic apparatus of the vehicle, and may exist as a physical computing unit or a virtual machine, to make a direct or indirect communication connection with a gateway.

A base node (BN, Base Node) is responsible for diagnostic tasks and information transmission related to an underlying system and an operating platform. The base node may be one or more, and may but is not limited to be disposed in a safety system of a complex ECU.

A module node (MN, Module Node) is responsible for diagnostic tasks and information transmission for a driving assistance category module. The module node MN may be one or more, and may but is not limited to be disposed in one or more main control computing subsystems of a complex ECU.

A feature node (FN, Feature Node) is responsible for diagnostic tasks and information transmission of various scenario features of driving assistance. The feature node FN may be one or more, and may be dynamically deployed under one or more module nodes MNs based on resource usage.

This application proposes a vehicle fault diagnostic method. A person skilled in the art may understand that a hierarchical diagnostic method in this application may be applied to determining and rectifying various faults of a vehicle. For example, the vehicle fault diagnostic method in this application may be further used to diagnose, for example, faults of a chassis system and an on-board entertainment system of the vehicle. In this embodiment, an ADAS system in an intelligent driving technology is used as an example to describe the vehicle fault diagnostic method and apparatus.

An advanced driving assistance system (ADAS, Advanced Driving Assistance System) is a controller that analyzes and identifies, based on environment data inside and outside the vehicle collected by various sensors distributed on the vehicle, objects in and around the vehicle based on safety requirements, and determines behaviors, obstacles and scenarios that affect safe driving, so that an executor can alarm a driver and a passenger and actively intervene in a driving behavior of the vehicle if necessary. Types and functions of sensors of the ADAS system are diversified. For example, the sensors may include a visual sensor, including a forward, a rearward, and a lateral radar distributed outside the vehicle, such as a laser radar, a millimeter wave radar, and an ultrasonic radar; may include a camera, such as a monocular camera or a binocular camera; and may include any sensing element having sensing of sound, temperature, pressure, electrical signals, and the like.

The ADAS system can be divided into autonomous emergency braking (AEB, Autonomous Emergency Braking), rear autonomous emergency braking (RAEB, Rear AEB), door opening warning (DOW, Door Open Warning), lane keep assistance (Lane Keep Assistance, LKA), adaptive cruise control (ACC, Adaptive Cruise Control), integrated cruise assistance (ICA, Integrated Cruise Assistance), navigation cruise assistance (NCA, Navigation Cruise Assistance), adaptive lighting control, blind spot monitoring, driver fatigue monitoring, automatic parking assist, and the like based on driving assistance scenario features.

In an MDC network architecture, due to the large concentration of computing capabilities, active and standby computing systems are arranged on hardware to increase redundancy. In addition, a plurality of heterogeneous computing systems are provided in addition to safety systems in a form of, for example, micro-control units MCUs, to support compatibility with computing units produced by different suppliers, such as AI SoC. In terms of software and business logic, each ECU is no longer a single diagnostic access point, but is associated with each other to flexibly serve various driving assistance functions of the ADAS system.

Therefore, the vehicle fault diagnostic method takes a driving assistance function as a diagnostic objective, and is carried out hierarchically based on a function category and a specific scenario feature. Fault information represents a state in which a specified function cannot be performed, for example, represents a state in which a specified function of the driving assistance applied in this embodiment. In this embodiment, each level has at least one node. At least one lower-level node is deployed under at least one upper-level node. The upper-level node is configured to aggregate and control the at least one lower-level node. The upper-level node serves as a transmission and convergence point of fault information of the lower-level node and a distribution point for controlling and managing the lower-level node.

Figure 1:
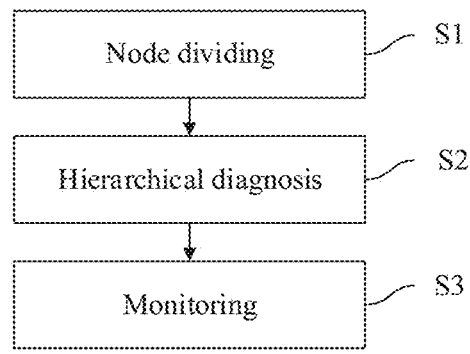
FIG. 1 is a flowchart of a vehicle fault diagnostic method according to an embodiment.

FIG. 1 shows a vehicle fault diagnostic method according to this embodiment, including a node dividing step S1, a hierarchical diagnostic step S2, and a monitoring step S3.

Figure 2:
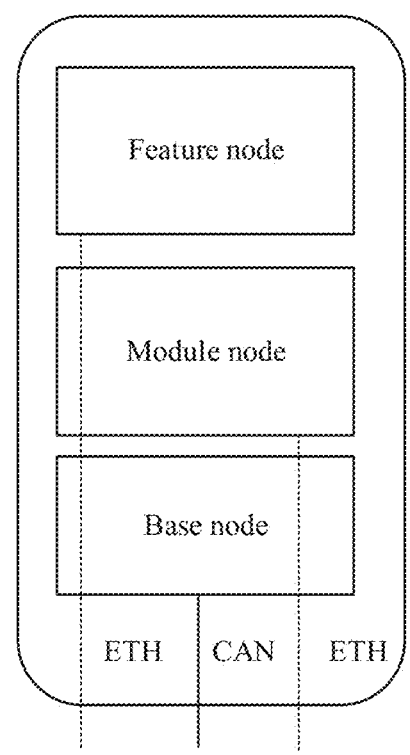
FIG. 2 is a schematic diagram of hierarchical diagnostic nodes of an ADAS system according to an embodiment.

In the node dividing step S1 of the method shown in FIG. 1, for example, a plurality of levels of nodes for diagnosing faults are hierarchically divided with a driving assistance function as a diagnostic target. FIG. 2 is a schematic diagram of hierarchical diagnosis for an ADAS system according to this embodiment. Nodes of three levels are divided. A first level is a base node (BN, Base Node). The base node is responsible for fault diagnosis and information transmission of an underlying system and an operating environment, and corresponds to an underlying system level of the ADAS system. The base node is connected to a gateway, which is not shown in the figure, through a low-speed bus CAN (represented by a solid line). When a module node MN fails, the base node BN can learn the fault and take a countermeasure. A second level is a module node (MN, Module Node). The module node is responsible for fault diagnosis and information transmission of a driving assistance processing category of the system, and is connected to the gateway through a high-speed bus ETH (indicated by a dotted line). When the feature node FN fails, the module node MN can learn the fault and take a countermeasure. A third level is a feature node (FN, Feature Node). The feature node is responsible for fault diagnosis and processing of a driving assistance scenario feature, is connected to the gateway through a high-speed bus ETH, and may directly provide an access point for an external master computer or an OTA. The second-level module node MN is deployed under the first-level base node BN. Each third-level feature node FN is deployed under one or more second-level module nodes MNs. A meaning of the so-called upper and lower level relationship herein is that, for example, fault information of the module node MN is sent to the base node BN. Therefore, the base node BN is an upper-level node of the module node, and the module node MN is a lower-level node of the base node BN.

As described above, in an example in which nodes are divided into three levels in this embodiment, the foregoing first-level base node BN corresponds to the first diagnostic module in this application, the second-level module node MN corresponds to the second diagnostic module in this application, and the third-level feature node FN corresponds to the third diagnostic module in this application. However, in another embodiment, the nodes may also be divided into two levels or more than four levels.

Figure 5:
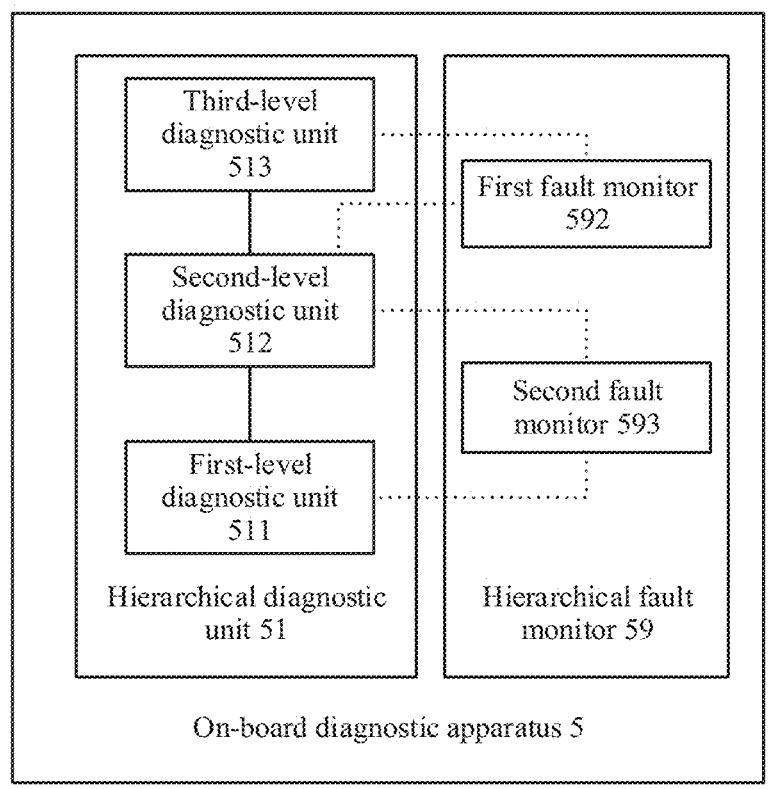
FIG. 5 is a schematic diagram of a structure of an on-board diagnostic apparatus according to an embodiment.
Figure 6:
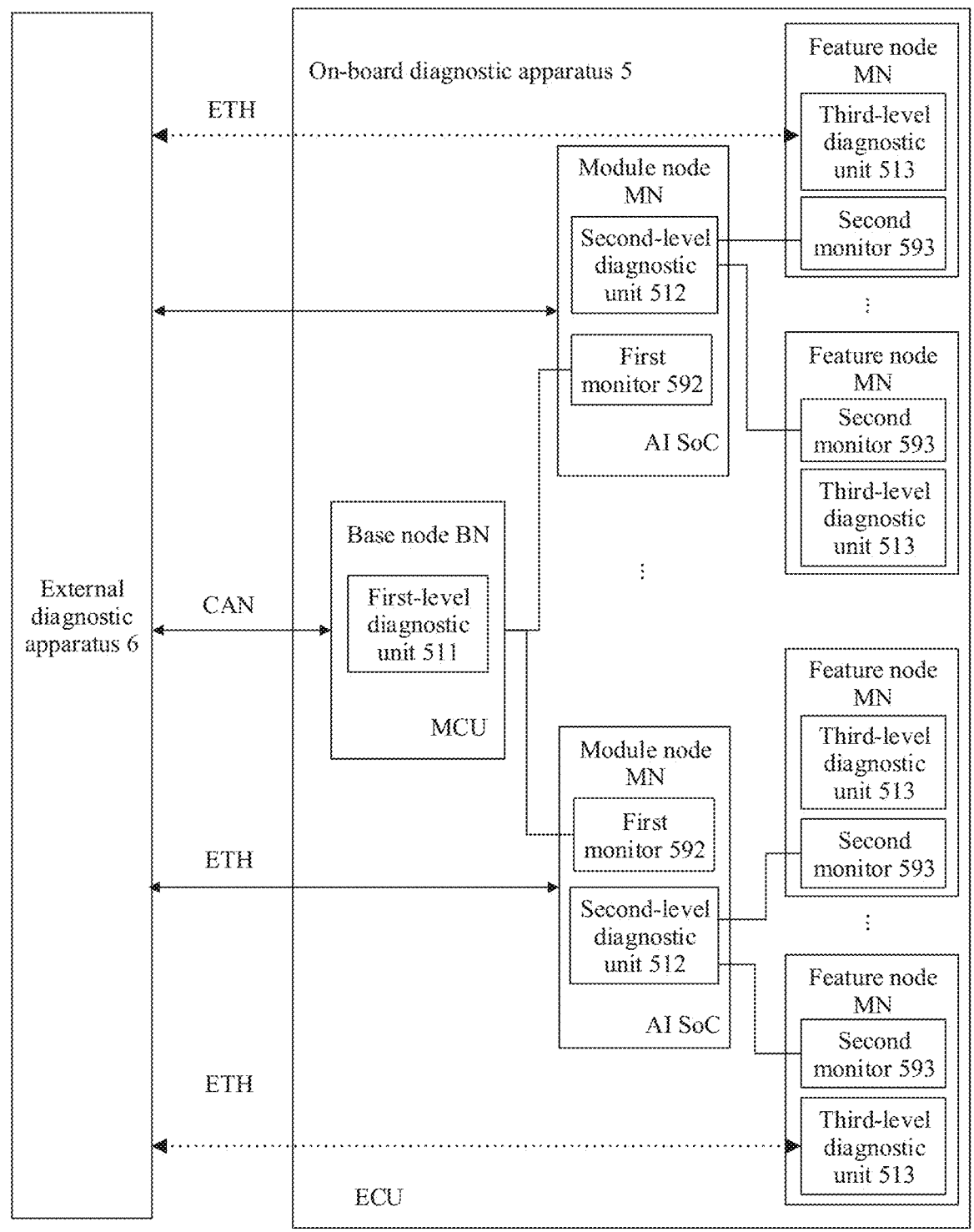
FIG. 6 is a logic diagram of interaction between various parts of a fault diagnostic system for a vehicle according to an embodiment.

In addition, in this embodiment, the base node BN, the module node MN, and the feature node FN are integrated in the MDC of the ADAS system as functional modules (that is, fault diagnostic apparatus 5 in FIG. 5 and FIG. 6). As shown in FIG. 6, the on-board diagnostic apparatus 5 is a heterogeneous ECU that includes one MCU and a plurality of AI SOCs.

The diagnostic target at the first-level base node BN includes but is not limited to a status of a key hardware of the underlying system and the operating platform or operating environment of the system, such as CPU usage, memory usage, a network bandwidth, and a key hardware such as liquid cooling system, of the MDC system. The base node BN monitors and records fault information of the underlying system. The fault information corresponds to the first fault information in this application.

At the third-level feature node FN, because specific scenario features of the driving assistance are diverse, the diagnostic target may include but is not limited to AEB, RAEB, DOW, LKA, ACC, ICA, NCA, and the like. Therefore, a plurality of feature nodes FNs may be disposed. Each feature node FN corresponds to one scenario feature. That is, the feature node FN monitors and records fault information of the driving assistance scenario feature. The fault information corresponds to the third fault information in this application.

Figure 3:
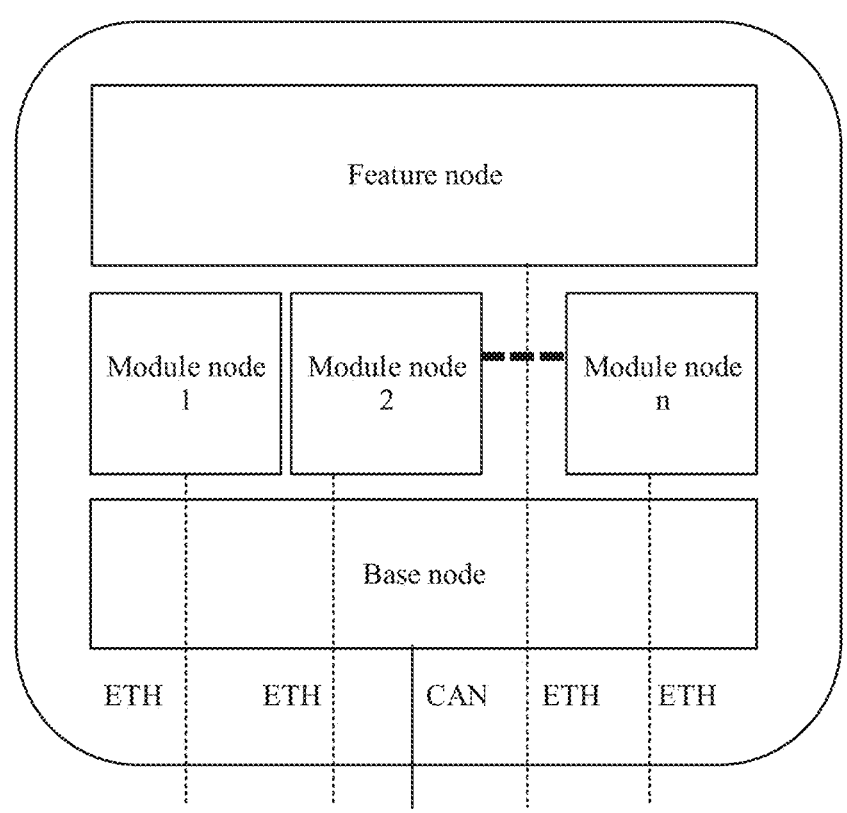
FIG. 3 is a schematic diagram of deployment of hierarchical nodes in an implementation according to an embodiment.

At the second-level module node MN, the diagnostic target may be deployed based on a driving assistance category to which the scenario feature belongs, so that each module node MN corresponds to one driving assistance category module. Therefore, there may be one or more module nodes MNs based on different quantities of driving assistance categories. As shown in FIG. 3, 1 to n module nodes MNs may be dynamically allocated. A form of the module node MN may be that each module node MN corresponds to one computing system, or may be that a plurality of virtual machines are created in one computing unit, and each module node MN corresponds to one of the virtual machines. When there is no diagnostic task, virtual machines of the corresponding module nodes are released to reduce occupied space. The module node MN monitors and records fault information of the driving assistance category module. The fault information corresponds to the second fault information in this application.

Figure 4:
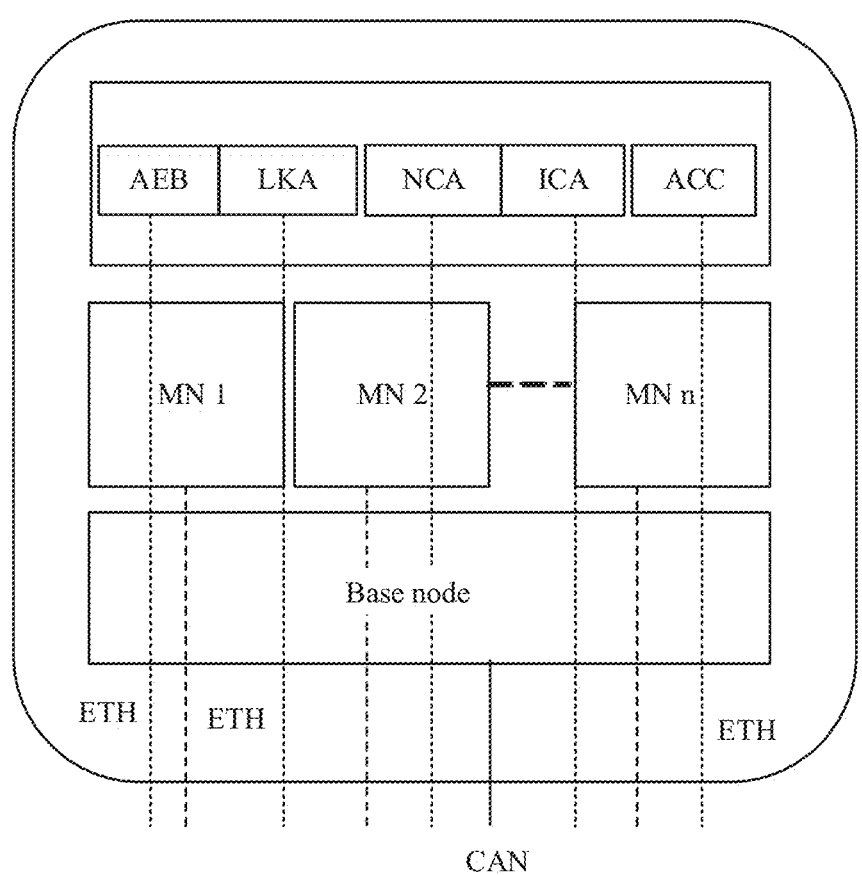
FIG. 4 is a schematic diagram of deployment of hierarchical nodes in another implementation according to an embodiment.

In an implementation of this embodiment, the driving assistance category may be classified into a safety category and a non-safety category based on a strictness of a safety requirement. For example, as shown in FIG. 4, in a scenario feature, AEB relates to emergency braking, and LKA relates to line deviation adjustment, both of which affect driving safety. Therefore, a feature node of AEB and a feature node of LKA are deployed under a safety domain module node MN 1 corresponding to a safety category module. For example, adaptive lighting control relates to automatic adjustment of lighting with environmental factors such as weather, and NCA relates to road path navigation and optimization, both of which are more inclined to be related to driving comfort. Therefore, a feature node of adaptive lighting control and a feature node of NCA are deployed under a module node MN 2 corresponding to a non-safety category module.

Alternatively, the driving assistance category may be defined in terms of a source of sensor data. Because some specific NCA feature nodes FNs incorporate data from many sensors, such as data from a laser radar, an ultrasonic radar, a millimeter wave radar and a camera, the module node MN may include a laser radar module node MN 3, an ultrasonic radar module node MN 4, a millimeter wave radar module node MN 5, and a camera module node MN 6. In this way, third-level NCA feature nodes may be deployed under the module nodes MN 3, MN 4, MN 5, and MN 6 (not shown in the figure).

A person skilled in the art may understand that the second-level module node MN corresponding to the driving assistance category module may be dynamically deployed and flexibly increased or decreased based on a service logic requirement of driving assistance and a resource usage situation. One module node MN may deploy a plurality of feature nodes FNs. Conversely, one feature node FN may also be deployed under a plurality of module nodes MNs. In addition, when no diagnosis occurs in the ADAS system, a plurality of levels of nodes for fault diagnosis may not be deployed.

In the hierarchical diagnostic step S2 of the method shown in FIG. 1, fault diagnosis is performed at the plurality of levels of nodes. An upper-level node diagnoses fault information of the upper-level node, and diagnoses fault information of a lower-level node. A lowest-level feature node FN has no lower-level node, so the lowest-level feature node only diagnoses fault information of the lowest-level feature node. For example, fault information that is diagnosed at a module node MN and that is within a node management range of the module node MN includes but is not limited to hardware fault information and resource usage information. For example, a hardware fault is manifested as that a voltage of a network switching unit in an AI chip is too low, data processing of an AI computing unit in a processor is abnormal, and a temperature of a liquid cooling apparatus is too high. For example, a resource usage fault is manifested as low memory resource utilization of a chip. For another example, fault information that is of a feature node FN and that is diagnosed at the feature node FN includes but is not limited to data processing fault information and a hardware fault such as a sensor within the feature, for example, camera data input abnormality, forward laser radar data processing abnormality, laser radar micro-electromechanical system (MEMS, Micro-Electro-Mechanical System) failure in an NCA scenario feature.

In the monitoring step S3 of the method shown in FIG. 1, the fault information of the lower-level node may be monitored and reported to the upper-level node.

When a serious fault occurs on the lower-level node and the lower-level node stops working, a condition of the lower-level node can be monitored and reported to the upper-level node, so that the upper-level node can detect the fault of the lower-level node in time and obtain a diagnostic fault record, to prevent loss of the fault record. In addition, a controller at the upper-level node takes over a management right of the lower-level node in time and takes a fault isolation measure, to prevent a fault phenomenon from affecting more driving assistance functions, resulting in an expansion of fault sources and an increase of alarms. For example, a failure of the module node MN is monitored and reported to the base node BN, and the base node BN may directly guide an AEB feature of the ADAS system to make an emergency stop of the vehicle.

In this embodiment, the monitoring step S3 may be performed at a node at which a monitoring object is located, or may be performed at another node created for monitoring.

In this embodiment, the hierarchical diagnostic step S2 of the method shown in FIG. 1 further includes that repair of the lower-level node can be performed at the upper-level node based on the fault information of the lower-level node. For example, the base node BN finds, based on the reported fault information, that one module node MN deployed under the base node BN fails, and determines, based on a fault type, whether to repair the module node MN. If the base node BN determines to repair the module node MN, the base node BN restarts the module node MN or upgrades software of the module node MN. If the base node BN determines not to repair the module node MN, the base node BN records at least the fault information, to complete flushing in conjunction with future over the air (OTA, Over the Air) communication or near-end upgrade. For example, if the module node MN discovers, based on the reported fault information, a feature fault under the module node MN, the module node MN may obtain, based on fault information of a feature node FN, the feature node FN corresponding to the fault information and a fault type. This facilitates targeted repair of the feature node FN. In addition, the detailed fault information that is recorded can be used as a backup for fault query.

It is conceivable that at least one of the plurality of levels of nodes may communicate with the outside based on various data buses, for example, but not limited to a CAN, an ETH, a FlexRay, an LIN, and the like.

In this embodiment, the plurality of levels of nodes communicate with the master computer based on DoIP (Diagnostic communication over Internet Protocol, diagnostic communication over internet protocol) of a high-speed bus ETH. Specifically, at least one module node MN may independently provide a DoIP diagnostic access point externally, or a plurality of module nodes MNs aggregate and use one DoIP diagnostic access point. At least one feature node FN can independently provide a DoIP diagnostic access point or a diagnostic address-based access point externally. When the feature node FN is running, a fault can be quickly diagnosed and recovered easily with the external master computer or OTA, to provide a possibility of rapid repair or flashing.

In this embodiment, the base node BN may communicate with the master computer based on the bus CAN, so that the technical solutions of this application can be generally applicable to a bus CAN product that is more mature in commercial use at present, a CAN communication standard DoCAN may be used, and a communication speed is 125 KB/s.

Figure 12:
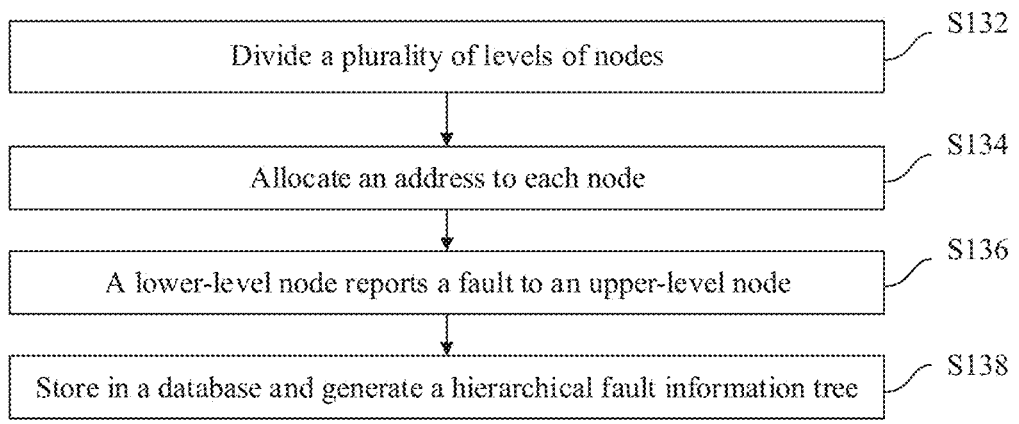
FIG. 12 is a flowchart of steps of a data recording method according to an embodiment.
Figure 13:
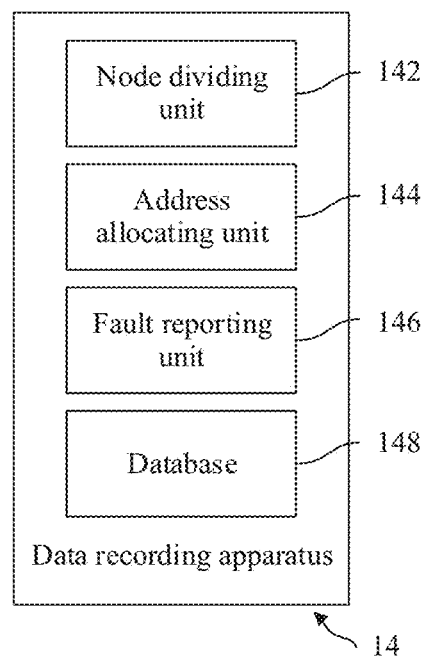
FIG. 13 is a schematic diagram of a structure of a data recording apparatus according to an embodiment.

An embodiment of this application further provides a data recording method for recording fault information and the like during diagnosis. FIG. 12 and FIG. 13 each shows a flowchart of steps of a data recording method according to an embodiment and a data recording apparatus 14 according to an embodiment. The data recording apparatus 14 in this embodiment performs the data recording method in FIG. 13, and is configured to record fault information of a vehicle. The data recording apparatus 14 includes a node dividing unit 142, an address allocating unit 144, a fault reporting unit 146, and a database 148.

Specifically, as shown in the figure, the node dividing unit 141 performs S132, to divide, by using a driving assistance function of the vehicle as a diagnostic target, a plurality of levels of nodes for diagnosing a fault. At least one lower-level node is deployed under at least one upper-level node. For this step, refer to the node dividing step S1 in FIG. 1. Details are not described herein again.

The address allocating unit 144 performs S134 to allocate an address DA to each node at each level. An address of a lower-level node includes an address of an upper-level node. Based on DoIP, an address DA is allocated to each node, so that a deployment relationship of nodes at each level can be displayed from a node address, and backtracking and locating based on the node level is convenient to be performed when fault information is queried. For allocating an address DA based on a node, refer to FIG. 10. Each feature node, each module node MN, and each base node BN are allocated with an address DA.

The fault reporting unit 146 performs S136 to report fault information to the upper-level node at the lower-level node. The fault information includes at least an address of the lower-level node and a fault type in a form of code. The fault reporting unit 146 is equivalent to the hierarchical fault monitor in FIG. 5. For example, when the data recording apparatus 14 is applied to the on-board diagnostic apparatus 5 in FIG. 5, Table 1 below shows fault information about each module node MN reported by the fault reporting unit 146 that is located at the module node MN and that is equivalent to a first fault monitor 592 to the base node BN, and Table 2 below shows fault information about each feature node FN reported by the fault reporting unit 146 that is located at the feature node FN and that is equivalent to a second fault monitor 593 to the module node MN.

In Table 1, a diagnostic trouble code (Diagnostic Trouble Code) of the module node MN is represented by MDTC module. For example, MDTC1 represents a fault of a first AI SoC 11 or a main system. A diagnostic address (Diagnostic Address) of the first AI SoC 11 or an A system is represented by, for example, MDA1, and is generally a 2-byte hexadecimal number, such as "0xE000". DTC2 represents, for example, a fault of a second AI SoC 11 or a standby system. An address of the second AI SoC 11 or a B system is represented by, for example, MDA2, such as "0xE001". Data identifiers (Data identifier) MDID1 to MDID5 in the table respectively indicate, for example, fault information of hardware of the module node MN, such as a network switching unit failure and an AI computing unit failure of a processor, or fault information of resource usage, such as a decrease in CPU usage.

In Table 2, a diagnostic trouble code of the feature node is represented by FA. For example, FADTC1 represents a fault of a feature node NCA. An address of the feature node NCA is represented by, for example, FDA1, or may be a 2-byte hexadecimal number. A fault identifier FA1-SUB1 of a feature node under an NCA feature indicates, for example, a hardware failure of a camera used by the NCA. For example, a front camera located on a bumper is damaged. For another example, FADTC2 represents a fault of a feature node RAEB. An address of the feature node RAEB is represented by, for example, FDA2. A fault identifier FA2-SUB2 of a feature node under a RAEB feature indicates, for example, a data processing exception of the RAEB.

It can be understood that the code and identifiers in Table 1 and Table 2 are examples only for convenience of description, and may be arbitrarily named and defined based on a requirement in practice. For example, the diagnostic trouble code may be, for example, one or a combination of letters, symbols, or numbers. The data identifier may be, for example, represented by a 2-byte binary number.

TABLE 1

Fault diagnostic information of a module node

| Diagnostic trouble code of a module node | Diagnostic address of a module node | Data identifier | Fault description |
|---|---|---|---|
| MDTC1 | MDA1 | MDID1 | CPU usage abnormality |
| | | MDID2 | Memory usage abnormality |
| | | MDID3 | Network bandwidth abnormality |
| | | MDID4 | Key hardware failure |
| | | MDID5 | ... |
| | | ... | ... |
| MDTC2 | MDA2 | MDID1 | CPU usage abnormality |
| | | MDID2 | Memory usage abnormality |
| | | MDID3 | Network bandwidth abnormality |
| | | MDID4 | Key hardware failure |
| | | MDID5 | ... |
| | | ... | ... |

TABLE 2

Fault diagnostic information of a feature node

| Diagnostic trouble code of a feature node | Feature node Diagnostic address | Fault identifier of a feature node | Fault description |
|---|---|---|---|
| FADTC1 | FDA1 | FA1-SUB1 | NCA camera hardware failure |
| | | FA1-SUB2 | NCA laser radar data input abnormality |
| | | ... | ... |
| FADTC2 | FDA2 | FA2-SUB1 | RAEB backward ultrasonic radar data processing abnormality |
| | | FA2-SUB2 | RAEB data input abnormality |
| | | ... | ... |
| FADTC3 | FDA3 | FA3-SUB1 | LKA millimeter wave radar hardware failure |
| | | FA3-SUB2 | LKA data processing abnormality |
| | | ... | ... |
| ... | ... | ... | ... |
| FADTC6 | FDA6 | FA6-SUB1 | ... |
| | | FA6-SUB2 | ... |
| | | ... | ... |

Figure 14:
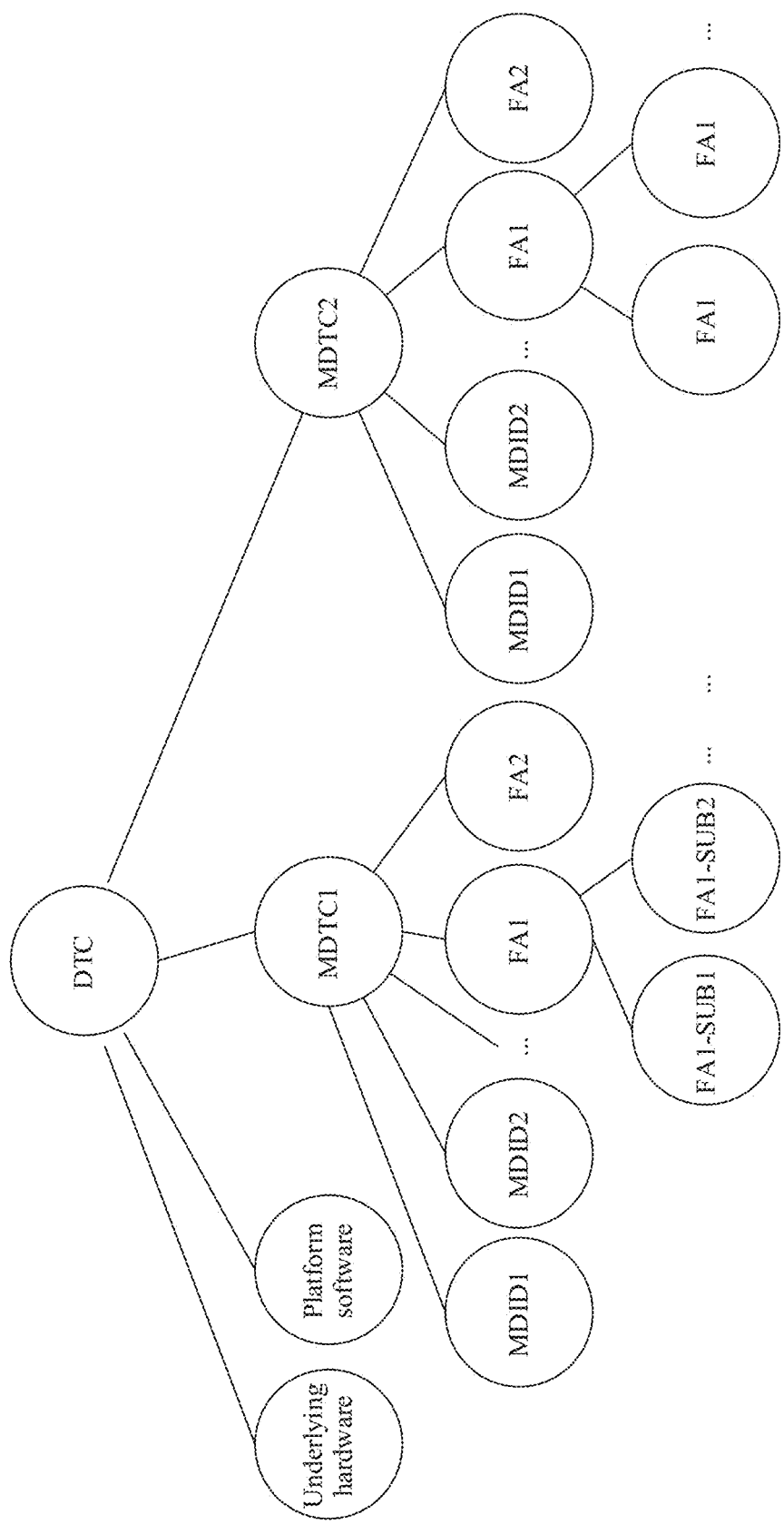
FIG. 14 is a schematic diagram of a hierarchical fault information tree.

The database 148 is configured to perform S138 for storing the fault information, to generate a hierarchical fault information tree 15 as shown in FIG. 14. The hierarchical fault information tree 15 is generated based on the node address. Except for a base node BN where system fault code DTC is located, each node at each level can be located and traced based on the nodes at upper and lower levels for a diagnostic unit and/or a master computer at the upper level node to query, to implement quickly fault isolation and fixed-point repair or upgrade services.

Corresponding to the vehicle fault diagnostic method shown in FIG. 1, FIG. 5 shows a schematic diagram of a structure of an on-board diagnostic apparatus 5 according to an embodiment. The on-board diagnostic apparatus 5 includes a hierarchical diagnostic unit 51 and a hierarchical fault monitor 59.

The hierarchical diagnostic units 51 in FIG. 5 are respectively located at a plurality of levels of nodes. The plurality of levels of nodes are divided and formed by using a driving assistance function as a diagnostic target. A lower-level node is deployed under one or more upper-level nodes. The hierarchical diagnostic unit 51 executes the hierarchical diagnostic step S2 of the method shown in FIG. 1, and respectively implements fault diagnosis at the plurality of levels of nodes. An upper-level diagnostic unit is configured to diagnose fault information of the upper-level node and fault information of a lower-level node. Each lower-level node corresponds to one lower-level diagnostic unit.

The structure in FIG. 2 is used as an example. A first-level diagnostic unit 511 corresponds to the first-level base node BN in FIG. 2, and is configured to diagnose the fault information of the base node. The fault information of the base node is related to the underlying system required for the operation of the entire ADAS system. A second-level diagnostic unit 512 corresponds to the second-level module node MN in FIG. 2, and is configured to diagnose fault information of a module node at a lower level of the base node BN. The fault information of the module node is related to the driving assistance category module explained above. A third-level diagnostic unit 513 corresponds to the third-level feature node FN in FIG. 2. Fault information of the feature node FN is related to the driving assistance scenario feature explained above.

The hierarchical fault monitor 59 of each level in FIG. 5 performs step S3 of the method shown in FIG. 1, for monitoring fault information of the next-level node and reporting the fault information to the upper-level diagnostic unit. Specifically, the hierarchical fault monitor 59 includes a first fault monitor 592 and a second fault monitor 593. The first fault monitor 592 is configured to monitor the fault information of the module node and report the fault information to the first-level diagnostic unit 511, so that the first-level diagnostic unit 511 records the fault information of the module node. The second fault monitor 593 is configured to monitor the fault information of the feature node and report the fault information to the second-level diagnostic unit 512, so that the second-level diagnostic unit 512 records the fault information of the feature node. No corresponding fault monitor is provided for the first-level diagnostic unit 511 as the uppermost level.

Correspondingly, in this embodiment, the first fault monitor 592 may be disposed at a module node, or may be disposed and executed at a node that is additionally created for monitoring the module node. The second fault monitor 593 may be disposed at a feature node, or may be disposed and executed at a node that is additionally created for monitoring the feature node.

In this embodiment, the upper-level diagnostic unit 51 repairs the lower-level node based on the fault information of the lower-level node.

Figure 7:
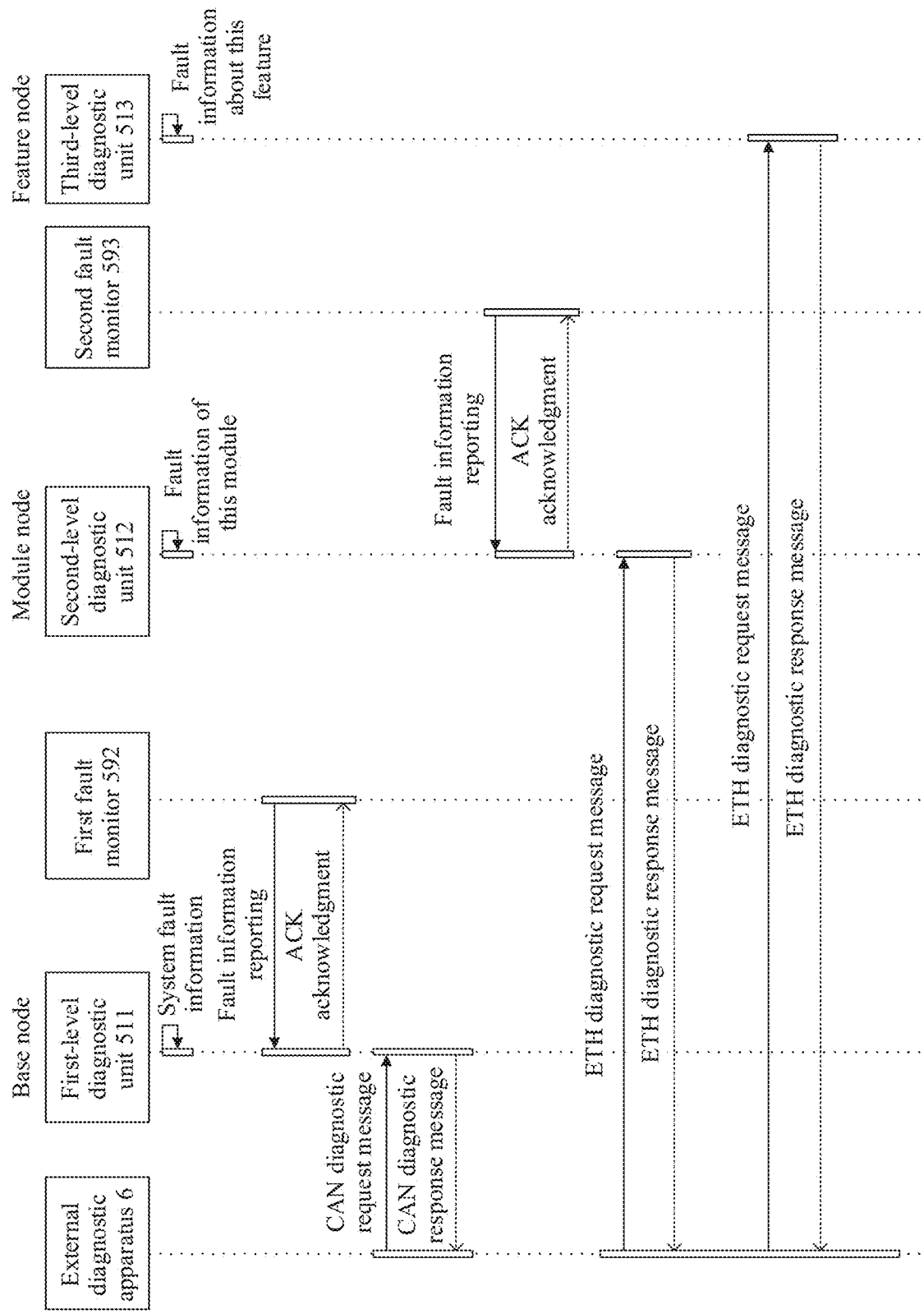
FIG. 7 schematically shows an implementation process of critical steps of hierarchical access performed by the fault diagnostic system in FIG. 6.

FIG. 6 schematically shows a logic diagram of interaction between various parts of a fault diagnostic system S for a vehicle according to an embodiment. FIG. 7 schematically shows an implementation process of critical steps of hierarchical access by the fault diagnostic system S in FIG. 6

The fault diagnostic system S for the vehicle shown in FIG. 6 includes an on-board diagnostic apparatus 5 shown in FIG. 5, a master computer of an external diagnostic apparatus 6, and a plurality of vehicle buses. The external diagnostic apparatus 6 is configured to query fault information of each hierarchical diagnostic unit 51 in the on-board diagnostic apparatus 5 and perform repair. Each of the hierarchical diagnostic units 51 of the on-board diagnostic apparatus 5 is communicatively connected to the external diagnostic apparatus through the vehicle bus. The first-level diagnostic unit 511 at the base node BN interacts with the external diagnostic apparatus 6 based on a DoCAN through the bus CAN. The second-level diagnostic unit 512 at the module node MN interacts with the external diagnostic apparatus 6 through the ETH. The third-level diagnostic unit 513 at the feature node FN interacts with the external diagnostic apparatus 6 through the ETH. In addition, as shown in FIG. 6, the on-board diagnostic apparatus 5 physically includes an MCU and a plurality of AI SoCs. The first-level diagnostic unit 511 is disposed on the MCU. The second-level diagnostic unit 512, the third-level diagnostic unit 513, the first monitor 592, and the second monitor 593 are disposed on the AI SoCs. In addition, it may be understood that the on-board diagnostic apparatus 5 further includes a communication interface. The communication interface is configured to connect to the bus. Specifically, the first-level diagnostic unit 511 is connected to the bus through one communication interface. The second-level diagnostic unit 512 and the third-level diagnostic unit 513 are located on a same physical unit (AI SoC), so that the second-level diagnostic unit 512 and the third-level diagnostic unit 513 are connected to the bus through a same communication interface. As another embodiment, the second-level diagnostic unit 512 and the third-level diagnostic unit 513 may be disposed in different physical units. In this case, the second-level diagnostic unit 512 and the third-level diagnostic unit 513 may be connected to the bus through different communication interfaces.

As shown in FIG. 7, the first-level diagnostic unit 511 diagnoses, at the base node BN, the fault information of the underlying system of the node. The second-level diagnostic unit 512 diagnoses, at the module node MN, the module fault information of the node. The third-level diagnostic unit 513 diagnoses, at the feature node FN, the feature fault information of the node. The first fault monitor 592 monitors and reports a fault at the module node MN to the first-level diagnostic unit 511. The first-level diagnostic unit 511 at the base node BN sends an acknowledgment (ACK, Acknowledge) message to the first fault monitor 592. The second fault monitor 593 monitors and reports a fault at the feature node FN to the second-level diagnostic unit 512. The second-level diagnostic unit 512 at the module node MN sends an ACK message to the second fault monitor 593. After the external diagnostic apparatus 6 is connected, the external diagnostic apparatus 6 sends a diagnostic request message to the first-level diagnostic unit 511 at the base node BN through the CAN, and then obtains a diagnostic response message returned by the first-level diagnostic unit 511. The external diagnostic apparatus 6 sends a diagnostic request message to the second-level diagnostic unit 512 at the module node MN and the third-level diagnostic unit 513 at the feature node FN through the ETH, and then obtains diagnostic response messages returned by the second-level diagnostic unit 512 and the third-level diagnostic unit 513 respectively.

Therefore, the fault information of the nodes at each level can be obtained independently and directly by the external diagnostic apparatus 6, so that the external diagnostic apparatus 6 can implement a targeted fault rectification action based on the specific fault information at each level, for example, independently restarting the module node MN, even restarting a process internally for a feature, or flushing from the master computer based on the feature.

This application further provides a computer-readable storage medium. The computer-readable storage medium stores program instructions that can be read by a computer. The computer can execute the diagnostic method in the embodiment shown in FIG. 1 by running the program instructions, or serve as the on-board diagnostic apparatus 5 in the embodiment shown in FIG. 5. Based on such an understanding, the technical solutions of this application essentially, or the part contributing to the conventional technology, or some of the technical solutions may be implemented in a form of a software product and sold or used as an independent product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

This application further provides a computing apparatus, including at least one processor and at least one memory. The memory stores program instructions. When the program instructions are executed by the at least one processor, the at least one processor is enabled to perform the diagnostic method in the embodiment shown in FIG. 1, or serve as the diagnostic apparatus 5 in the embodiment shown in FIG. 5.

Figure 8:
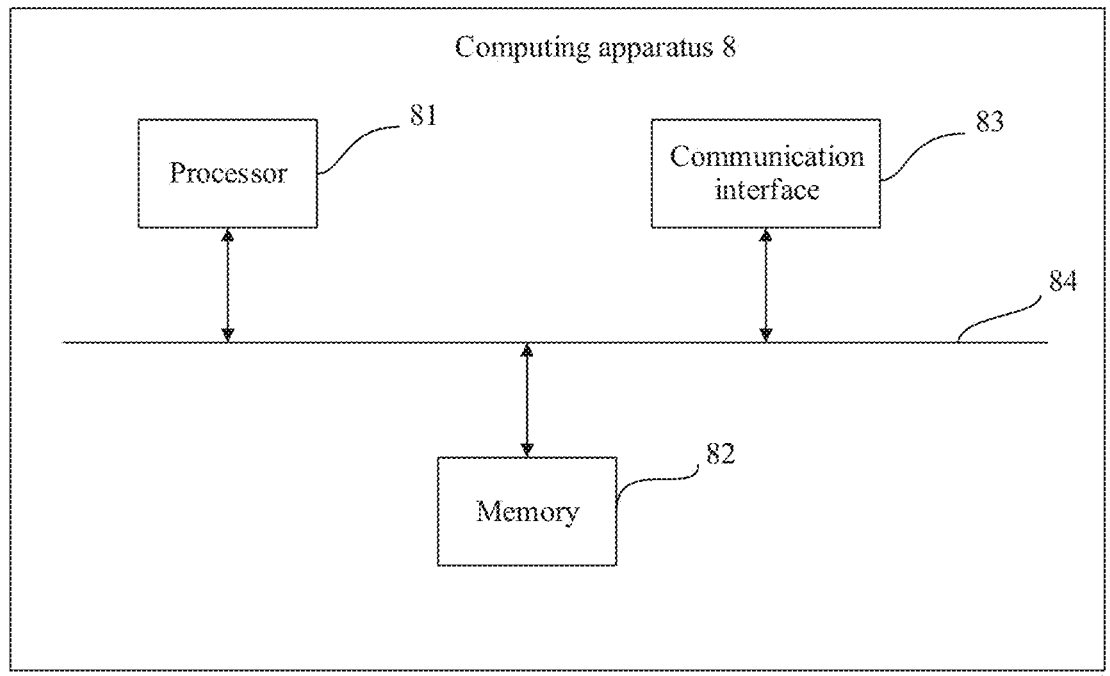
FIG. 8 is a schematic diagram of a structure of a computing apparatus according to an embodiment.

FIG. 8 is a schematic diagram of a structure of a computing apparatus 8 according to an embodiment of this application. The computing apparatus 8 is, for example, a complex ECU existing in a form of a multi-domain controller (MDC). The computing apparatus 8 includes at least one processor 81, at least one memory 82, a communication interface 83, and a bus 84.

It should be understood that the communication interface 83 in the computing apparatus 8 shown in FIG. 8 may be used to communicate with another apparatus.

The processor 81 may be connected to the memory 82. The memory 82 may be configured to store code and data of program instructions. Therefore, the memory 82 may be a storage unit in the processor 81, an external storage unit independent of the processor 81, or a component including the storage unit in the processor 81 and the external storage unit independent of the processor 81.

Optionally, the computing apparatus 8 may further include a bus 84. The memory 82 and the communication interface 83 may be connected to the processor 81 through the bus 84. The bus 84 may be a peripheral component interconnect (Peripheral Component Interconnect, PCI) bus, an extended industry standard architecture (Extended Industry Standard Architecture, EISA) bus, or the like. The bus 84 may be classified into an address bus, a data bus, a control bus, and the like. To facilitate representation, the bus is represented by using only one line in FIG. 8, but it does not indicate that there is only one bus or one type of buses.

It should be understood that, in this embodiment of this application, the processor 81 may be a multiprocessor, and may be a central processing unit (central processing unit, CPU). Alternatively, the processor may be another general-purpose processor, a graphics processing unit (Graphics Processing Unit, GPU), a neural-network processing unit (Neural-network Processing Unit, NPU), a digital signal processor (digital signal processor, DSP), an application specific integrated circuit (application specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like. Alternatively, the processor 81 uses one or more integrated circuits to execute a related program, to implement the technical solutions provided in embodiments of this application.

The memory 82 may include a read-only memory and a random access memory, and provide instructions and data to the processor 81. A part of the processor 81 may further include a non-volatile random access memory. For example, the processor 81 may further store information about an apparatus type.

When the computing apparatus 8 runs, the processor 81 runs the program instructions in the memory 82 to perform the steps of the diagnostic method in the embodiment shown in FIG. 1.

It should be understood that, the computing apparatus 8 according to this embodiment of this application may correspond to a corresponding body that performs the methods according to embodiments of this application. The foregoing and other operations and/or functions of the modules in the computing apparatus 8 are separately used to implement corresponding procedures of the methods in the embodiments, such as the diagnostic apparatus and various units of the diagnostic apparatus in FIG. 5. For brevity, details are not described herein again.

Figure 9:
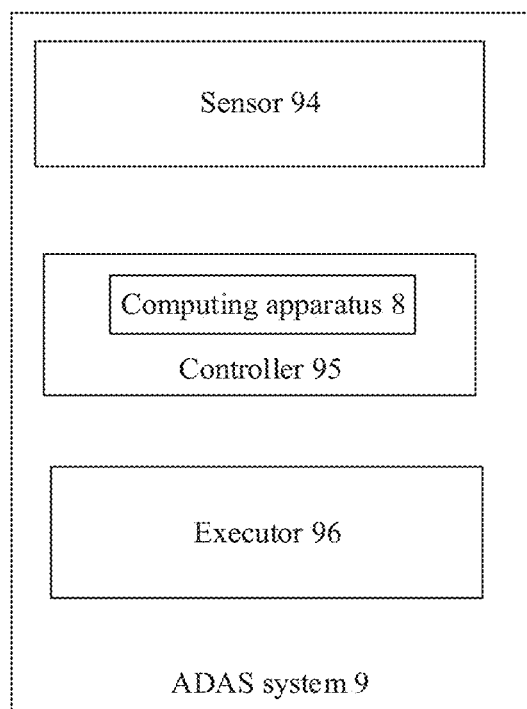
FIG. 9 is a schematic diagram of a structure of an advanced driving assistance system ADAS according to an embodiment.

As shown in FIG. 9, this application further provides an advanced driving assistance system ADAS 9, including a sensor 94, a controller 95, and an executor 96. The controller 95 includes the computing apparatus 8 shown in FIG. 8. Therefore, the controller 95 can implement the fault diagnostic method in embodiments of this application to perform hierarchical diagnosis, to form a fault diagnostic protection net for a complex ADAS system.

Figure 10:
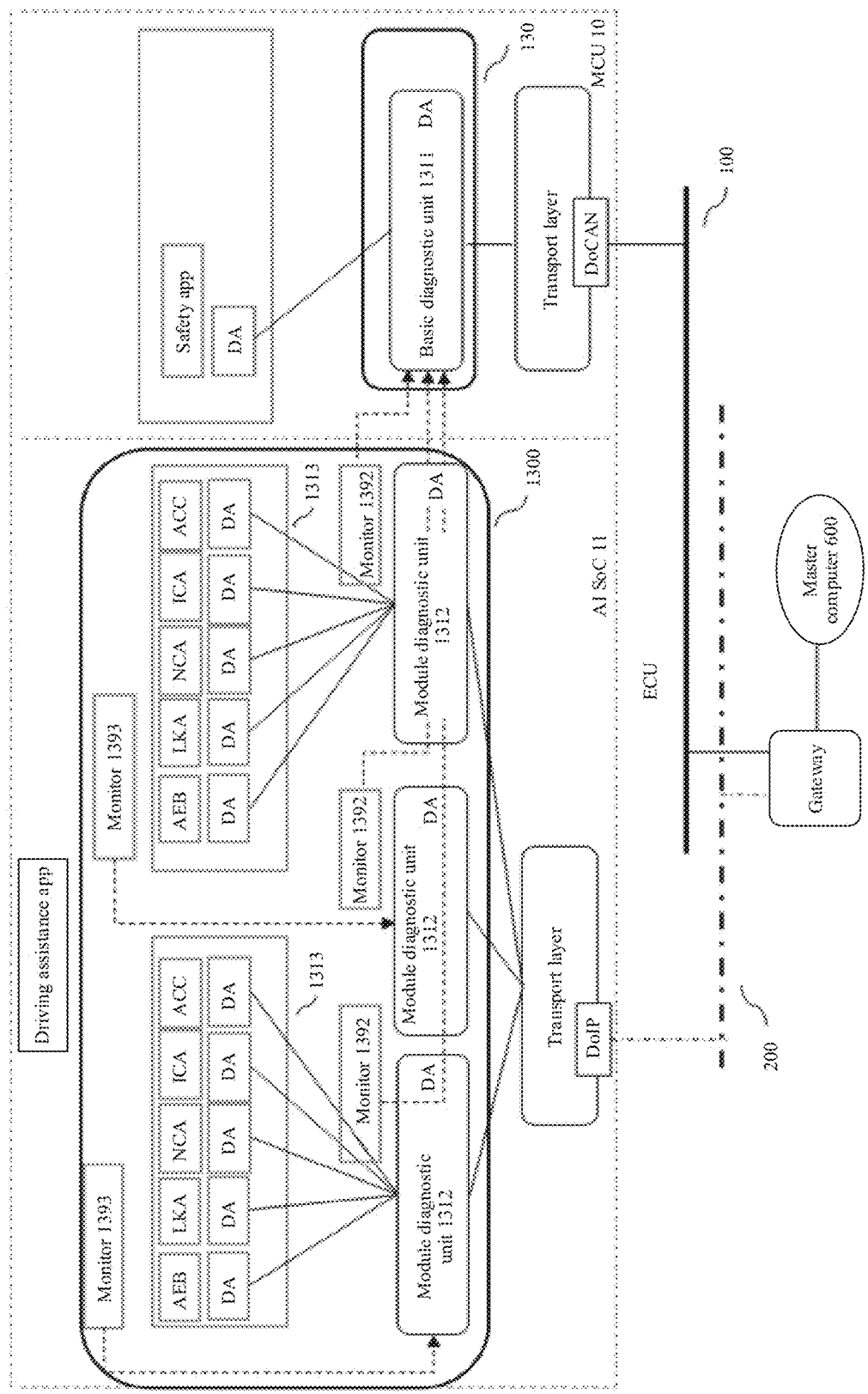
FIG. 10 is a schematic diagram of a structure of an ECU according to an embodiment.

As shown in FIG. 6 and FIG. 10, this application further provides an on-board safety system. For example, the on-board safety system is implemented in a form of an on-board micro control unit (MCU) 10. The on-board safety system includes a storage unit (not shown in the figure) and a control unit 130. The control unit 130 includes a basic diagnostic unit 1311. The basic diagnostic unit 1311 is configured to diagnose basic fault information. The basic fault information includes underlying system fault information and module fault information of a driving assistance category module. The basic diagnostic unit 1311 in this embodiment may be equivalent to the first-level diagnostic unit 511 in FIG. 5. The storage unit is configured to store the basic fault information and a safety application (Safety APP, Application) instruction. The safety application instruction is executed to obtain a response result for the basic fault information according to a training and decision algorithm, for example, making a decision result of immediately guiding a vehicle to pull over. The control unit 130 runs the safety application, so that the control unit 130 executes a corresponding decision result based on the basic fault information. In this embodiment, a first bus 100 connected to the MCU may be a CAN, so that the basic diagnostic unit in the control unit communicates with an external master computer 600 through a gateway based on a DoCAN at a transport layer. The master computer is, for example, a near-end external diagnostic apparatus (terminal) or a far-end OTA or a cloud server. Certainly, the first bus 100 may alternatively select an ETH. As shown in FIG. 5, the base node BN includes the first-level diagnostic unit 511, the module node MN includes the second-level diagnostic unit 512 and the first monitor 592, and the feature node MN includes the third-level diagnostic unit 513 and the second monitor 593.

As shown in FIG. 6 and FIG. 10, this application further provides an artificial intelligence system on chip (AI SoC, Artificial Intelligence System On Chip) 11. The AI SoC 11 includes a storage unit (not shown in the figure) and a control unit 1300. The control unit includes a module diagnostic unit 1312 and a module fault monitor 1392 corresponding to the module diagnostic unit 1312. The module diagnostic unit 1312 may be equivalent to the second-level diagnostic unit 512 in FIG. 5, and is configured to diagnose module fault information of a driving assistance category. The module fault monitor 1392 may be equivalent to the first fault monitor 592 in FIG. 5, and is configured to monitor the module diagnostic unit 1312 and report the module fault information to the basic diagnostic unit 1311 of the on-board micro-control unit MCU 10 shown in FIG. 10. The storage unit of the AI SoC 11 is configured to store the module fault information and a driving assistance application instruction. The driving assistance application instruction is executed to obtain a response result for the module fault information according to a training and decision algorithm, for example, restarting a faulty driving assistance module. The control unit 1300 runs the driving assistance application instruction in the storage unit of the AI SoC 11, so that the control unit 1300 executes, based on the module fault information, a result of responding to the module fault information. The module diagnostic unit 1312 of the AI SoC 11 communicates with the external master computer 600 through a second bus 200 at the transport layer. The master computer 600 is, for example, a near-end external diagnostic apparatus or a far-end OTA or a cloud server.

In an embodiment, the control unit 1300 further includes a feature diagnostic unit 1313 and a feature fault monitor 1393 corresponding to the feature diagnostic unit 131. The feature diagnostic unit 1313 may be equivalent to the third-level diagnostic unit 513 in FIG. 5, and is configured to diagnose feature fault information of a driving assistance feature. The feature fault monitor 1393 may be equivalent to the second fault monitor 593 in FIG. 5, and is configured to monitor the feature diagnostic unit 131 and report the feature fault information to the module diagnostic unit 1312. The storage unit 1200 is further configured to store the feature fault information. The driving assistance application instruction is executed to obtain a response result for the feature fault information according to a training and decision algorithm, for example, generate an alarm for a driver or quickly locating a fault location and directly request an OTA to directly repair a fault. The control unit 1300 further runs the driving assistance application instruction in the storage unit 1200, so that the control unit 1300 executes, based on the feature fault information, a result of responding to the feature fault information. In this embodiment, the second bus 200 is based on an ETH. The AI SoC, especially the module diagnostic unit 1312 and the feature diagnostic unit 1313 in the AI SoC, communicates with the master computer based on DoIP. Certainly, the second bus 200 may select a CAN, so that the AI SoC alternatively communicates with the master computer based on a DoCAN.

Figure 11A:
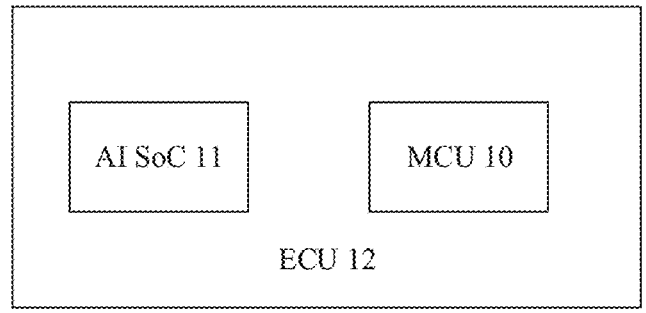
FIG. 11A to FIG. 11C are example diagrams of product forms of an ECU.
Figure 11B:
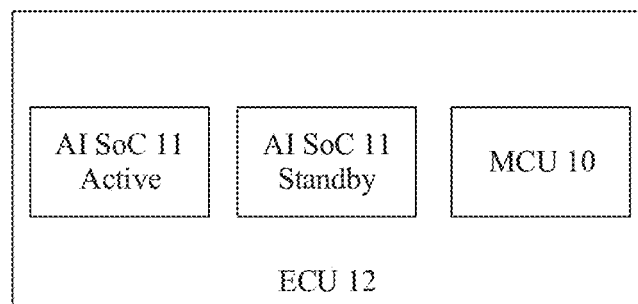
Figure 11C:
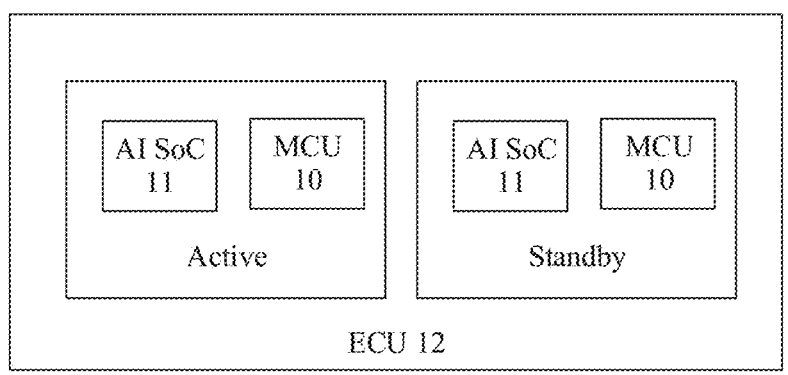

For an ECU product form under a multi-domain controller (MDC) architecture, as shown in FIG. 11A, one on-board micro control unit (MCU) 10 shown in FIG. 10 and one AI SoC 11 may be configured in an ECU 12. Alternatively, as shown in FIG. 11B, one on-board micro control unit (MCU) 10 and two AI SoCs 11 may be configured in an ECU as an active system and a standby system (or referred to as systems A and B) of a module node MN. Alternatively, as shown in FIG. 11C, two system-level active/standby systems may be configured in an ECU, and one on-board micro control unit (MCU) 10 and one AI SoC 11 are both disposed in the active system (or referred to as a system A) and the standby system (or referred to as a system B).

In addition, the ECU 12 may alternatively include any one or more modules in the AI SoC 11 and an MCU 10. A person skilled in the art may understand that, to implement redundancy of the system, components, and internal modules, product forms may be arbitrary in terms of quantity and combination, and are not limited to the foregoing forms in FIG. 11A to FIG. 11C.

In addition, in the product form, the advanced driving assistance system ADAS 9 may also be set as an active system and a standby system. That is, an active ADAS system includes all features in the AI SoC 11, and a standby ADAS system includes all features in the AI SoC 11. Therefore, more than one ADAS system 9 may be included in the ECU 12.

Descriptions of the foregoing embodiments are merely an example. A person skilled in the art may figure out that the driving assistance category may alternatively be divided in various manners. For example, based on passive assistance and active assistance, the driving assistance category may be divided into a warning-type driving assistance module and an execution-type driving assistance module. Alternatively, for example, based on a direction of lateral or longitudinal movement relative to a driving direction, the driving assistance category may be divided into a transverse driving assistance module and a longitudinal driving assistance module. Based on an in-vehicle manner and an outside-vehicle manner, the driving assistance category may be divided into an in-vehicle driving assistance module and an outside-vehicle driving assistance module. As a result, allocation and deployment of a module node MN are quite flexible. In addition, the module node MN may be created, for example, in a manner of creating one module node MN for each AI SoC, or in a manner of starting a plurality of virtual machines for each AI SoC, so that each virtual machine corresponds to one module node MN. It may be further extended that scenario features of all ADAS systems of a vehicle are deployed under each module node MN, including but not limited to AEB, RAEB, DOW, LKA, ACC, ICA, and NCA. Each scenario feature may alternatively be deployed on a plurality of module nodes MNs, for example, but not limited to, AEB, RAEB, and DOW are deployed on one module node MN, and LKA, ACC, ICA, and NCA are deployed on another module node MN.

In addition, this embodiment provides only three levels of diagnostic nodes for the plurality of levels of nodes, and the technical solution of this application may also be divided into more levels. For example, one level of sub-module nodes is further deployed under the module nodes MNs. Under the sub-module nodes, feature node FNs are deployed to form four levels.

Correspondingly, monitoring of each level of nodes may alternatively have more levels. For example, when there are four levels of diagnostic nodes, there is also a sub-module monitor for reporting sub-module node faults to the module node MN. Faults of the feature nodes FNs are reported by a feature fault monitor to the sub-module node.

A person skilled in the art may arbitrarily divide or deploy levels of nodes based on a hardware quantity of an ADAS system and/or a complexity of a scenario feature and a processing capability of an AI SoC.

In this specification and claims, similar terms such as "first" and "second" are merely used to distinguish between similar objects, and do not represent a specific order of the objects. It may be understood that specific orders or sequences may be exchanged if permitted, so that the embodiments of this application described herein can be implemented in an order other than an order illustrated or described herein.

In the descriptions of this specification, involved reference numerals such as S1 and S2 that indicate steps do not necessarily indicate that the steps are to be performed based on the order, and consecutive steps may be transposed if allowed, or may be performed simultaneously.

"One embodiment" or "an embodiment" mentioned in this specification indicates that a particular feature, structure or property that is described with reference to the embodiment is included in at least one embodiment of this application. Therefore, the terms "in one embodiment" or "in an embodiment" that appear in this specification do not necessarily indicate a same embodiment, but may indicate a same embodiment. Further, in one or more embodiments, the particular features, structures, or properties can be combined in any proper manner, as will be clear from this disclosure to a person of ordinary skill in the art.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, function units in embodiments of this application may be integrated into one processing unit, or each of the units may exist alone physically, or two or more units may be integrated into one unit.

It should be noted that the foregoing are merely example embodiments of this application and applied technical principles. A person skilled in the art may understand that this application is not limited to specific embodiments described herein, and a person skilled in the art may make various obvious changes, readjustments, and replacements without departing from the protection scope of this application. Therefore, although this application is described in detail by using the foregoing embodiments, this application is not limited to the foregoing embodiments, and may further include more other equivalent embodiments without departing from the concept of this application. These embodiments all fall within the protection scope of this application.

What is claimed is:

1. An on-board diagnostic apparatus comprising a first diagnostic module, a second diagnostic module, a first communication interface, a second communication interface, at least one processor, and at least one memory coupled to the at least one processor and storing programming instructions for execution by the at least one processor to cause the on-board diagnostic apparatus to perform operations comprising:
monitoring and recording first fault information;
monitoring and recording second fault information, wherein the second fault information comprises second diagnostic module fault information indicating a fault of the second diagnostic module;
sending the second fault information to the first diagnostic module;
repairing the second diagnostic module in response to receiving the second diagnostic module fault information;
enabling the first diagnostic module to communicate with a master computer; and
enabling the second diagnostic module to communicate with the master computer.

2. The on-board diagnostic apparatus according to claim 1, further comprising a third diagnostic module and a third communication interface, and the operations further comprise:
monitoring and recording third fault information;
sending the third fault information to the second diagnostic module; and
enabling the third diagnostic module to communicate with the master computer.

3. The on-board diagnostic apparatus according to claim 2, wherein
the third fault information comprises third diagnostic module fault information indicating a fault of the third diagnostic module; and wherein the operations further comprise:
repairing the third diagnostic module in response to receiving the third diagnostic module fault information.

4. The on-board diagnostic apparatus according to claim 2, wherein the third fault information comprises fault information of a driving assistance scenario feature.

5. The on-board diagnostic apparatus according to claim 1, wherein the first fault information comprises fault information of an underlying system.

6. The on-board diagnostic apparatus according to claim 1, wherein the second fault information comprises fault information of a driving assistance category module.

7. The on-board diagnostic apparatus according to claim 1, wherein the second diagnostic module is located on an artificial intelligence system on chip (AI SoC).

8. A vehicle fault diagnostic method, comprising:
monitoring and recording, by a first diagnostic module, first fault information;
monitoring and recording, by a second diagnostic module, second fault information;
sending, by the second diagnostic module, the second fault information to the first diagnostic module, wherein the second fault information comprises second diagnostic module fault information indicating a fault of the second diagnostic module;
repairing, by the first diagnostic module, the second diagnostic module in response to receiving the second fault information;
communicating, by the first diagnostic module, with a master computer through a first communication interface; and
communicating, by the second diagnostic module, with the master computer through a second communication interface.

9. The vehicle fault diagnostic method according to claim 8, further comprising:
monitoring and recording, by a third diagnostic module, third fault information;
sending, by the third diagnostic module, the third fault information to the second diagnostic module; and
communicating, by the third diagnostic module, with the master computer through a third communication interface.

10. The vehicle fault diagnostic method according to claim 9, wherein
the third fault information comprises third diagnostic module fault information indicating a fault of the third diagnostic module; and
the vehicle fault diagnostic method further comprises: repairing, by the second diagnostic module, the third diagnostic module in response to receiving the third diagnostic module fault information.

11. The vehicle fault diagnostic method according to claim 9, wherein the third fault information comprises fault information of a driving assistance scenario feature.

12. The vehicle fault diagnostic method according to claim 8, wherein the first fault information comprises fault information of an underlying system.

13. The vehicle fault diagnostic method according to claim 8, wherein the second fault information comprises fault information of a driving assistance category module.

14. The vehicle fault diagnostic method according to claim 8, wherein the second diagnostic module is located on an artificial intelligence system on chip (AI SoC).

15. A vehicle, comprising an on-board diagnostic apparatus, wherein the on-board diagnostic apparatus comprises a first diagnostic module, a second diagnostic module, a first communication interface, a second communication interface, at least one processor, and at least one memory coupled to the at least one processor and storing programming instructions for execution by the at least one processor to cause the on-board diagnostic apparatus to perform operations comprising:
monitoring and recording first fault information;
monitoring and recording second fault information, wherein the second fault information comprises second diagnostic module fault information indicating a fault of the second diagnostic module;
sending the second fault information to the first diagnostic module;
repairing the second diagnostic module in response to receiving the second diagnostic module fault information;
enabling the first diagnostic module to communicate with a master computer; and
enabling the second diagnostic module to communicate with the master computer.

16. The vehicle according to claim 15, wherein the on-board diagnostic apparatus further comprises a third diagnostic module and a third communication interface, and wherein the operations further comprise:
monitoring and recording third fault information;
sending the third fault information to the second diagnostic module; and
enabling the third diagnostic module to communicate with the master computer.

17. The vehicle according to claim 16, wherein the third fault information comprises third diagnostic module fault information indicating a fault of the third diagnostic module, and wherein the operations further comprise:
repairing the third diagnostic module in response to receiving the third diagnostic module fault information.

18. The vehicle according to claim 15, wherein the first fault information comprises fault information of an underlying system.

19. The vehicle according to claim 15, wherein the second fault information comprises fault information of a driving assistance category module.

20. The vehicle according to claim 15, wherein the second diagnostic module is located on an artificial intelligence system on chip (AI SoC).

* * * * *